US012737926B2

(12) United States Patent
Pham Van et al.

(10) Patent No.: US 12,737,926 B2
(45) Date of Patent: Sep. 15, 2026

(54) LOCAL ADAPTIVE INTER PREDICTION FOR G-PCC

(71) Applicant: QUALCOMM Incorporated, San Diego, CA (US)

(72) Inventors: Luong Pham Van, San Diego, CA (US); Geert Van der Auwera, San Diego, CA (US); Adarsh Krishnan Ramasubramonian, Irvine, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 698 days.

(21) Appl. No.: 18/060,208

(22) Filed: Nov. 30, 2022

(65) Prior Publication Data

US 2023/0177739 A1 Jun. 8, 2023

Related U.S. Application Data

(60) Provisional application No. 63/264,910, filed on Dec. 3, 2021.

(51) Int. Cl.

| | |
|---|---|
| ***H04N 19/597*** | (2014.01) |
| ***G06T 7/246*** | (2017.01) |
| ***G06T 9/40*** | (2006.01) |
| ***H04N 19/119*** | (2014.01) |
| ***H04N 19/527*** | (2014.01) |
| ***H04N 19/54*** | (2014.01) |
| ***H04N 19/70*** | (2014.01) |
| ***H04N 19/96*** | (2014.01) |

(52) U.S. Cl.

CPC ................ *G06T 9/40* (2013.01); *G06T 7/246* (2017.01); *G06T 2207/10028* (2013.01)

(58) Field of Classification Search

CPC . G06T 9/40; G06T 7/246; G06T 2207/10028; G06T 9/001; H04N 19/597; H04N 19/70; H04N 19/96; H04N 19/119; H04N 19/527; H04N 19/54

See application file for complete search history.

(56) References Cited

U.S. PATENT DOCUMENTS

2023/0164353 A1* 5/2023 Lee ...................... H04N 19/105 375/240.26

FOREIGN PATENT DOCUMENTS

WO 2020010446 A1 1/2020
WO 2021215849 A1 10/2021

OTHER PUBLICATIONS

Van, [G-PCC][ New proposal] Block partitioning for local road and object classification in InterEM version 3, ISO/IEC JTC 1/SC 29/ WG 7 m58130, Online—Oct. 2021 (Year: 2021).*

(Continued)

*Primary Examiner* — Vu Le
*Assistant Examiner* — Lei Zhao
(74) *Attorney, Agent, or Firm* — QUALCOMM Incorporated

(57) ABSTRACT

A method of decoding point cloud data comprises: determining that the point cloud data is split into a plurality of largest prediction units (LPUs), wherein at least two of the LPUs have different sizes along different directions; performing inter prediction to determine predicted points for the LPUs; and reconstructing points within the LPUs based on the predicted points for the LPUs.

24 Claims, 13 Drawing Sheets

(56) References Cited

OTHER PUBLICATIONS

Zhang, Adaptive Geometry Partition for Point Cloud Compression, IEEE Journals & Magazine | IEEE Xplore, Date of publication Aug. 2, 2021 (Year: 2021).*
International Search Report and Written Opinion—PCT/US2022/080760—ISA/EPO—Mar. 22, 2023.
Van L.P (Qualcomm)., et al., "[G-PCC] [New Proposal] Block Partitioning for Local Road and Object Classification in InterEM Version 3", 136. MPEG Meeting, Oct. 11, 2021-Oct. 15, 2021, Online, (Motion Picture Expert Group or ISO/IEC JTC1/SC29/WG11), No. m58130, Oct. 6, 2021, XP030298849.
Hur H., "[G-PCC][EE13.2] Report on Unified Partition Method for Motion Compensation (Test7)", International Organisation for Standardisation Organisation Internationale DE Normalisation ISO/IEC JTC 1/SC 29/WG 7 Coding of Moving Pictures and Audio, ISO/IEC JTC 1/SC 29/WG 7 m60189, Jul. 2022, 9 Pages.
ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.
Taiwan Search Report—TW111146339—TIPO—Feb. 12, 2026 (1 pp).

* cited by examiner

SERVER SYSTEM
1112

BITSTREAMS
1108

1106
1106
1104
1102
1100

BITSTREAMS
1108

LOCAL ADAPTIVE INTER PREDICTION FOR G-PCC

This application claims the benefit of U.S. provisional patent application 63/264,910, filed Dec. 3, 2021, the entire content of which is incorporated by reference.

TECHNICAL FIELD

This disclosure relates to point cloud encoding and decoding.

BACKGROUND

A point cloud is a collection of points in a 3-dimensional space. The points may correspond to points on objects within the 3-dimensional space. Thus, a point cloud may be used to represent the physical content of the 3-dimensional space. Point clouds may have utility in a wide variety of situations. For example, point clouds may be used in the context of autonomous vehicles for representing the positions of objects on a roadway. In another example, point clouds may be used in the context of representing the physical content of an environment for purposes of positioning virtual objects in an augmented reality (AR) or mixed reality (MR) application. Point cloud compression is a process for encoding and decoding point clouds. Encoding point clouds may reduce the amount of data required for storage and transmission of point clouds.

SUMMARY

In general, this disclosure describes techniques for Geometry Point Cloud Compression (G-PCC). The techniques of this disclosure may improve the performance of inter coding using local adaptive inter prediction for G-PCC, such as the G-PCC standard that is being developed within MPEG by the 3-Dimensional Graphics Team (3DG) group. A point cloud may be split into a plurality of Largest Prediction Units (LPUs). According to techniques of this disclosure, at least two of the LPUs have different sizes along different directions. For example, the LPUs may have a first size in a first direction (e.g., x, y, or z direction) and the LPUs may have a second size different from the first size in a second direction. In other words, the LPUs do not need to be strictly cubic. Allowing LPUs to have different sizes along different dimensions may allow the point cloud data to be split into LPUs according to a quadtree-binary tree splitting used for octree geometry coding of the point cloud data. A G-PCC encoder may perform inter prediction to determine predicted points for the LPUs and may encode points within the LPUs based on the predicted points for the LPUs. A G-PCC decoder may perform inter prediction to determine predicted points for the LPUs and may reconstruct points within the LPUs based on the predicted points for the LPUs. Allowing LPUs to have different sizes along different directions may increase coding efficiency.

In one example, this disclosure describes a method of decoding point cloud data, the method comprising: determining that the point cloud data is split into a plurality of largest prediction units (LPUs), wherein at least two of the LPUs have different sizes along different directions; performing inter prediction to determine predicted points for the LPUs; and reconstructing points within the LPUs based on the predicted points for the LPUs.

In another example, this disclosure describes a method of encoding point cloud data, the method comprising: determining that the point cloud data is split into a plurality of largest prediction units (LPUs), wherein at least two of the LPUs have different sizes along different directions; performing inter prediction to determine predicted points for the LPUs; and encoding points within the LPUs based on the predicted points for the LPUs.

In another example, this disclosure describes a device for decoding point cloud data, the device comprising: a memory configured to store the point cloud data; and one or more processors implemented in circuitry, the one or more processors configured to: determine that the point cloud data is split into a plurality of largest prediction units (LPUs), wherein at least two of the LPUs have different sizes along different directions; perform inter prediction to determine predicted points for the LPUs; and reconstruct points within the LPUs based on the predicted points for the LPUs.

In another example, this disclosure describes a device for encoding point cloud data, the device comprising: a memory configured to store the point cloud data; and one or more processors implemented in circuitry, the one or more processors configured to: determine that the point cloud data is split into a plurality of largest prediction units (LPUs), wherein at least two of the LPUs have different sizes along different directions; perform inter prediction to determine predicted points for the LPUs; and encode points within the LPUs based on the predicted points for the LPUs.

The details of one or more examples are set forth in the accompanying drawings and the description below. Other features, objects, and advantages will be apparent from the description, drawings, and claims.

BRIEF DESCRIPTION OF DRAWINGS

FIG. 11 is a conceptual diagram illustrating an example vehicle-based scenario in which one or more techniques of this disclosure may be used.

DETAILED DESCRIPTION

Figure 1:
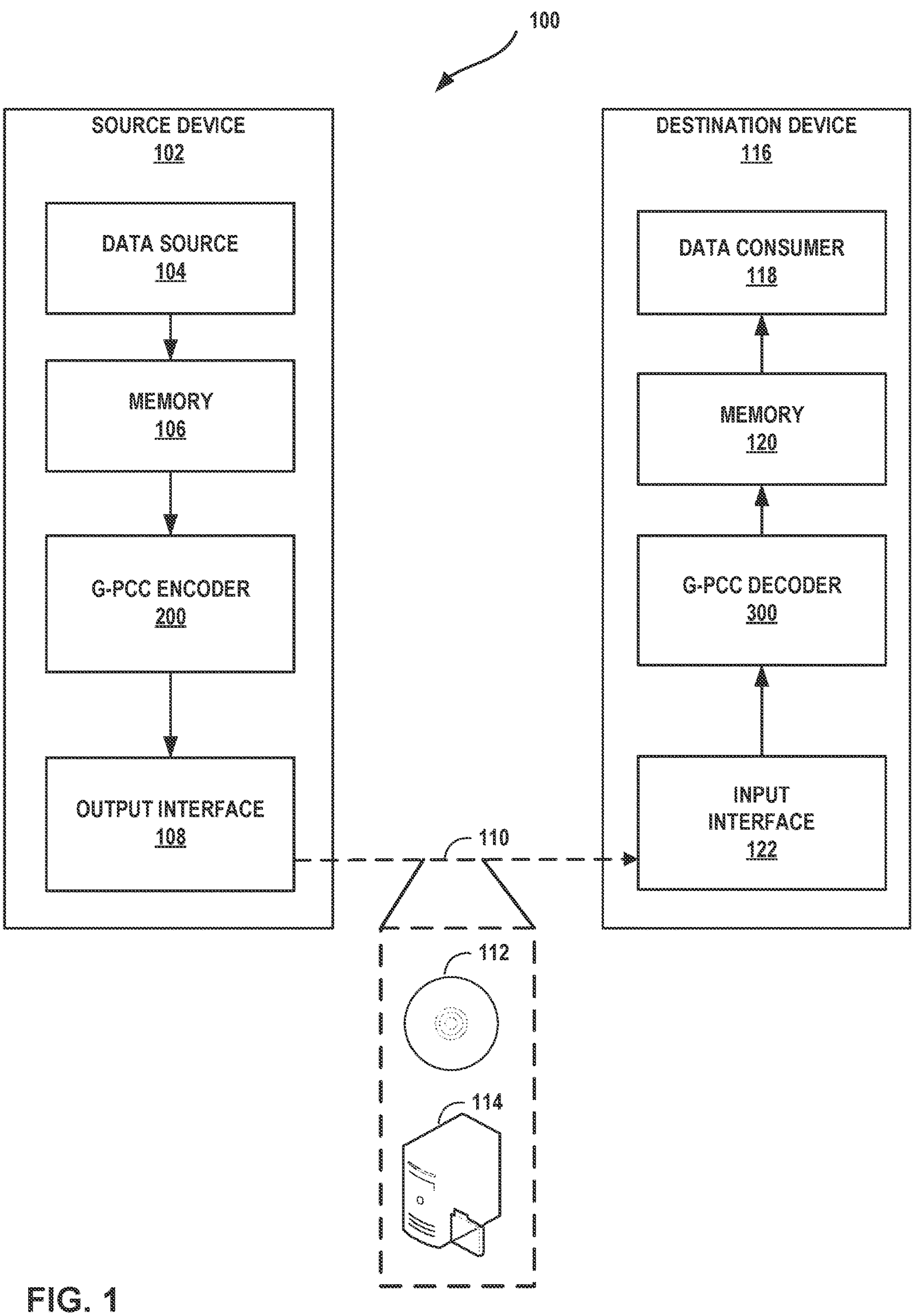
FIG. 1 is a block diagram illustrating an example encoding and decoding system that may perform the techniques of this disclosure.

A point cloud is a collection of points in a 3-dimensional space. In general, point cloud data includes any data for processing a point cloud, such as data representing the point cloud. The points may correspond to points on objects within the 3-dimensional space. Thus, point cloud data may be used to represent the physical content of a 3-dimensional space. Point cloud data may have utility in a wide variety of situations. For example, point cloud data may be used in the context of autonomous vehicles for representing the positions of objects on a roadway. In another example, point cloud data may be used in the context of representing the physical content of an environment for purposes of positioning virtual objects in an augmented reality (AR) or mixed reality (MR) application. Point cloud compression is a process for encoding and decoding point cloud data. Encoding point cloud data may reduce the amount of data required for storage and transmission of point cloud data. Geometry-based point cloud compression (G-PCC) is an approach for reducing the amount of data needed to encode or store point cloud data.

As part of encoding point cloud data, a G-PCC encoder may generate an octree. Each node of the octree corresponds to a cuboid space. A cuboid is a hexahedron having a six-faced solid. Each face of a cuboid is a quadrilateral. For ease of explanation, this disclosure may, in some circumstances, refer to a node and the cuboid space corresponding to the node interchangeably. Nodes of the octree can have zero child nodes or eight child nodes. In other examples, nodes can be divided into child nodes according to other tree structures. For example, a node of the octree may be divided into four or two child nodes. Thus, the octree may include quadtree or binary tree splitting. The child nodes of a parent correspond to cuboids within the cuboid corresponding to the parent node. The positions of individual points of a point cloud can be signaled relative to nodes corresponding to cuboids containing the points. If a node does not contain any points of the point cloud, the node is said to be unoccupied. If the node is unoccupied, it may not be necessary to signal additional data with respect to the node. Conversely, if a node contains one or more points of the point cloud, the node is said to be occupied.

Additionally, the same point cloud data may be divided into equally sized largest prediction units (LPUs). Thus, each of the LPUs may be a strict cube. A G-PCC encoder may perform inter prediction to predict points for the LPUs based on points in a reference frame. The reference frame comprises previously reconstructed point cloud data. The G-PCC encoder may encode points within the LPUs based on the predicted points for the LPUs. Similarly, a G-PCC decoder may perform inter prediction to predict points for the LPUs based on points in a reference frame. The G-PCC decoder may reconstruct points within the LPUs based on the predicted points for the LPUs.

There are several disadvantages associated with requiring each of the LPUs to be a strict cube. For example, the boundaries of the LPUs may not align with boundaries of cuboids of the octree. In another example, the boundaries of the LPUs may not align squarely with boundaries of the point cloud data. This non-alignment of boundaries may diminish coding efficiency, leading to more data being stored or transmitted to represent the point cloud data.

In accordance with techniques of this disclosure, at least two of the LPUs may have different sizes along different directions. Thus, the sizes of LPUs align with a quadtree-binary tree splitting of the point cloud data determined by octree geometry coding. This may increase coding efficiency, resulting in less data being stored or transmitted to represent the point cloud data.

FIG. 1 is a block diagram illustrating an example encoding and decoding system 100 that may perform the techniques of this disclosure. The techniques of this disclosure are generally directed to coding (encoding and/or decoding) point cloud data, i.e., to support point cloud compression. In general, point cloud data includes any data for processing a point cloud. The coding may be effective in compressing and/or decompressing point cloud data.

As shown in FIG. 1, system 100 includes a source device 102 and a destination device 116. Source device 102 provides encoded point cloud data to be decoded by a destination device 116. Particularly, in the example of FIG. 1, source device 102 provides the point cloud data to destination device 116 via a computer-readable medium 110. Source device 102 and destination device 116 may comprise any of a wide range of devices, including desktop computers, notebook (i.e., laptop) computers, tablet computers, set-top boxes, telephone handsets such as smartphones, televisions, cameras, display devices, digital media players, video gaming consoles, video streaming devices, terrestrial or marine vehicles, spacecraft, aircraft, robots, LIDAR devices, satellites, or the like. In some cases, source device 102 and destination device 116 may be equipped for wireless communication.

In the example of FIG. 1, source device 102 includes a data source 104, a memory 106, a G-PCC encoder 200, and an output interface 108. Destination device 116 includes an input interface 122, a G-PCC decoder 300, a memory 120, and a data consumer 118. In accordance with this disclosure, G-PCC encoder 200 of source device 102 and G-PCC decoder 300 of destination device 116 may be configured to apply the techniques of this disclosure related to inter coding using a local adaptive prediction for the GPCC standard. Thus, source device 102 represents an example of an encoding device, while destination device 116 represents an example of a decoding device. In other examples, source device 102 and destination device 116 may include other components or arrangements. For example, source device 102 may receive data (e.g., point cloud data) from an internal or external source. Likewise, destination device 116 may interface with an external data consumer, rather than include a data consumer in the same device.

System 100 as shown in FIG. 1 is merely one example. In general, other digital encoding and/or decoding devices may perform the techniques of this disclosure related to inter coding using a local adaptive prediction for the GPCC standard. Source device 102 and destination device 116 are merely examples of such devices in which source device 102 generates coded data for transmission to destination device 116. This disclosure refers to a "coding" device as a device that performs coding (encoding and/or decoding) of data. Thus, G-PCC encoder 200 and G-PCC decoder 300 represent examples of coding devices, in particular, an encoder and a decoder, respectively. In some examples, source device 102 and destination device 116 may operate in a substantially symmetrical manner such that each of source device 102 and destination device 116 includes encoding and decoding components. Hence, system 100 may support one-way or two-way transmission between source device 102 and destination device 116, e.g., for streaming, playback, broadcasting, telephony, navigation, and other applications.

In general, data source 104 represents a source of data (i.e., raw, unencoded point cloud data) and may provide a sequential series of "frames") of the data to G-PCC encoder 200, which encodes data for the frames. Data source 104 of source device 102 may include a point cloud capture device, such as any of a variety of cameras or sensors, e.g., a 3D scanner or a light detection and ranging (LIDAR) device, one or more video cameras, an archive containing previously captured data, and/or a data feed interface to receive data from a data content provider. Alternatively or additionally, point cloud data may be computer-generated from scanner, camera, sensor or other data. For example, data source 104 may generate computer graphics-based data as the source data, or produce a combination of live data, archived data, and computer-generated data. In each case, G-PCC encoder 200 encodes the captured, pre-captured, or computer-generated data. G-PCC encoder 200 may rearrange the frames from the received order (sometimes referred to as "display order") into a coding order for coding. G-PCC encoder 200 may generate one or more bitstreams including encoded data. Source device 102 may then output the encoded data via output interface 108 onto computer-readable medium 110 for reception and/or retrieval by, e.g., input interface 122 of destination device 116.

Memory 106 of source device 102 and memory 120 of destination device 116 may represent general purpose memories. In some examples, memory 106 and memory 120 may store raw data, e.g., raw data from data source 104 and raw, decoded data from G-PCC decoder 300. Additionally or alternatively, memory 106 and memory 120 may store software instructions executable by, e.g., G-PCC encoder 200 and G-PCC decoder 300, respectively. Although memory 106 and memory 120 are shown separately from G-PCC encoder 200 and G-PCC decoder 300 in this example, it should be understood that G-PCC encoder 200 and G-PCC decoder 300 may also include internal memories for functionally similar or equivalent purposes. Furthermore, memory 106 and memory 120 may store encoded data, e.g., output from G-PCC encoder 200 and input to G-PCC decoder 300. In some examples, portions of memory 106 and memory 120 may be allocated as one or more buffers, e.g., to store raw, decoded, and/or encoded data. For instance, memory 106 and memory 120 may store data representing a point cloud.

Computer-readable medium 110 may represent any type of medium or device capable of transporting the encoded data from source device 102 to destination device 116. In one example, computer-readable medium 110 represents a communication medium to enable source device 102 to transmit encoded data directly to destination device 116 in real-time, e.g., via a radio frequency network or computer-based network. Output interface 108 may modulate a transmission signal including the encoded data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded data.

In some examples, source device 102 may output encoded data to file server 114 or another intermediate storage device that may store the encoded data generated by source device 102. Destination device 116 may access stored data from file server 114 via streaming or download. File server 114 may be any type of server device capable of storing encoded data and transmitting that encoded data to the destination device 116. File server 114 may represent a web server (e.g., for a website), a File Transfer Protocol (FTP) server, a content delivery network device, or a network attached storage (NAS) device. Destination device 116 may access encoded data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to G-PCC encoder 200 and/or output interface 108, and destination device 116 may include an SoC device to perform the functionality attributed to G-PCC decoder 300 and/or input interface 122.

The techniques of this disclosure may be applied to encoding and decoding in support of any of a variety of applications, such as communication between autonomous vehicles, communication between scanners, cameras, sensors and processing devices such as local or remote servers, geographic mapping, or other applications.

Input interface 122 of destination device 116 receives an encoded bitstream from computer-readable medium 110 (e.g., a communication medium, storage device 112, file server 114, or the like). The encoded bitstream may include signaling information defined by G-PCC encoder 200, which is also used by G-PCC decoder 300, such as syntax elements having values that describe characteristics and/or processing of coded units (e.g., slices, pictures, groups of pictures, sequences, or the like). Data consumer 118 uses the decoded data. For example, data consumer 118 may use the decoded data to determine the locations of physical objects. In some examples, data consumer 118 may comprise a display to present imagery based on a point cloud.

G-PCC encoder 200 and G-PCC decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of G-PCC encoder 200 and G-PCC decoder 300 may be included in one or more encoders or decoders, either of which may be integrated as part of a combined encoder/decoder (CODEC) in a respective device. A device including G-PCC encoder 200 and/or G-PCC decoder 300 may comprise one or more integrated circuits, microprocessors, and/or other types of devices.

G-PCC encoder 200 and G-PCC decoder 300 may operate according to a coding standard, such as video point cloud compression (V-PCC) standard or a geometry point cloud compression (G-PCC) standard. This disclosure may generally refer to coding (e.g., encoding and decoding) of pictures to include the process of encoding or decoding data. An encoded bitstream generally includes a series of values for syntax elements representative of coding decisions (e.g., coding modes).

This disclosure may generally refer to "signaling" certain information, such as syntax elements. The term "signaling" may generally refer to the communication of values for syntax elements and/or other data used to decode encoded data. That is, G-PCC encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Point cloud compression activities are categorized in two different approaches. The first approach is "Video point cloud compression" (V-PCC), which segments the 3D object, and project the segments in multiple 2D planes (which are represented as "patches" in the 2D frame), which are further coded by a legacy 2D video codec such as a High Efficiency Video Coding (HEVC) (ITU-T H.265) codec. The second approach is "Geometry-based point cloud compression" (G-PCC), which directly compresses 3D geometry i.e., position of a set of points in 3D space, and associated attribute values (for each point associated with the 3D geometry). G-PCC addresses the compression of point clouds in both Category 1 (static point clouds) and Category 3 (dynamically acquired point clouds).

A point cloud contains a set of points in a 3D space, and may have attributes associated with the points. The attributes may be color information such as R, G, B or Y, Cb, Cr, or reflectance information, or other attributes. Point clouds may be captured by a variety of cameras or sensors such as LIDAR sensors and 3D scanners and may also be computer-generated. Point cloud data are used in a variety of applications including, but not limited to, construction (modeling), graphics (3D models for visualizing and animation), and the automotive industry (LIDAR sensors used to help in navigation), and in other applications that may employ the use of mobile phones, tablet computers, or other mobile computing devices.

The 3D space occupied by a point cloud data may be enclosed by a virtual bounding box. The position of the points in the bounding box may be represented by a certain precision; therefore, the positions of one or more points may be quantized based on the precision. At the smallest level, the bounding box is split into voxels which are the smallest unit of space represented by a unit cube. A voxel in the bounding box may be associated with zero, one, or more than one point. The bounding box may be split into multiple cube/cuboid regions, which may be called tiles. Each tile may be coded into one or more slices. The partitioning of the bounding box into slices and tiles may be based on number of points in each partition, or based on other considerations (e.g., a particular region may be coded as tiles). The slice regions may be further partitioned using splitting decisions similar to those in video codecs.

Figure 2:
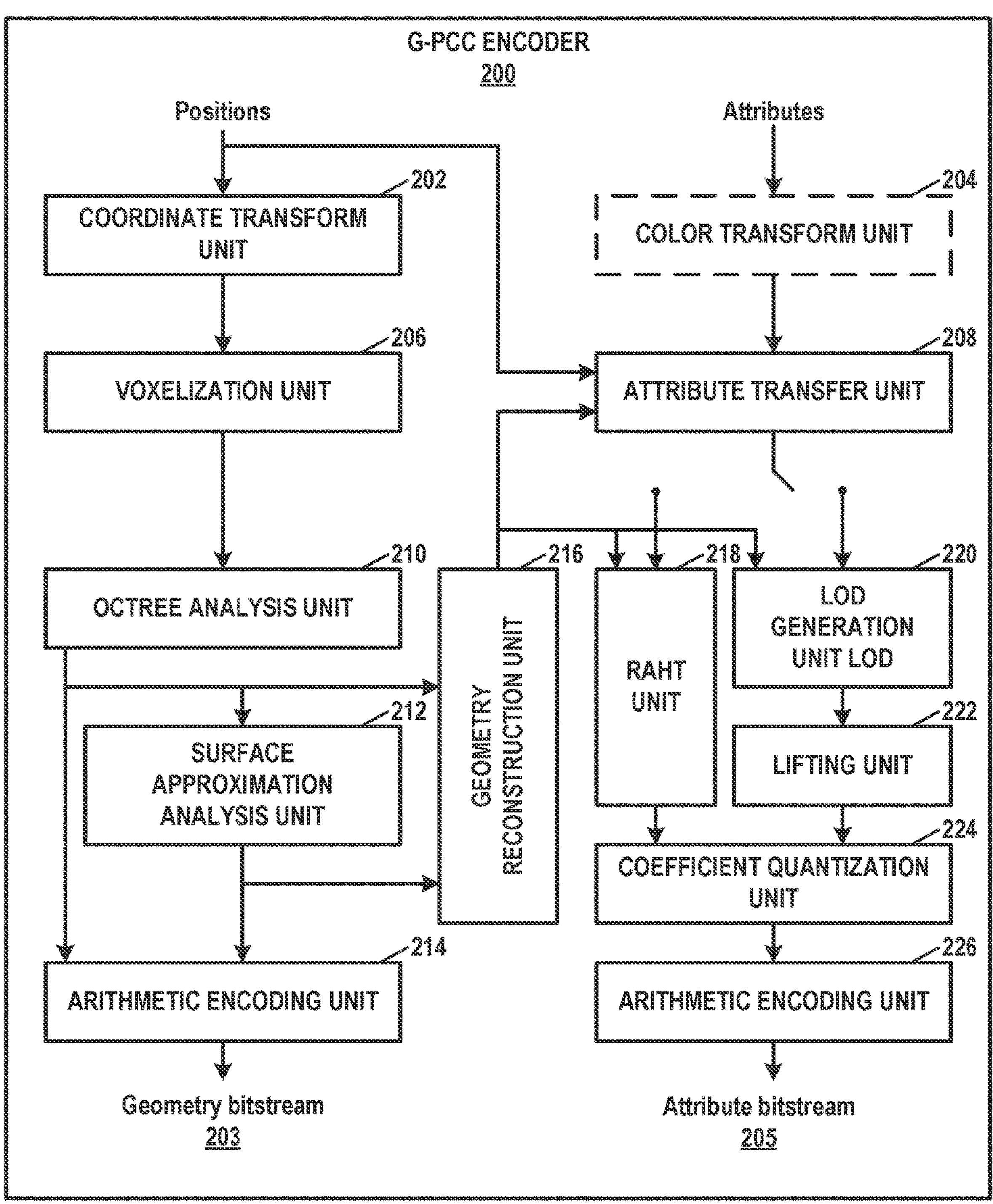
FIG. 2 is a block diagram illustrating an example Geometry Point Cloud Compression (G-PCC) encoder.
Figure 3:
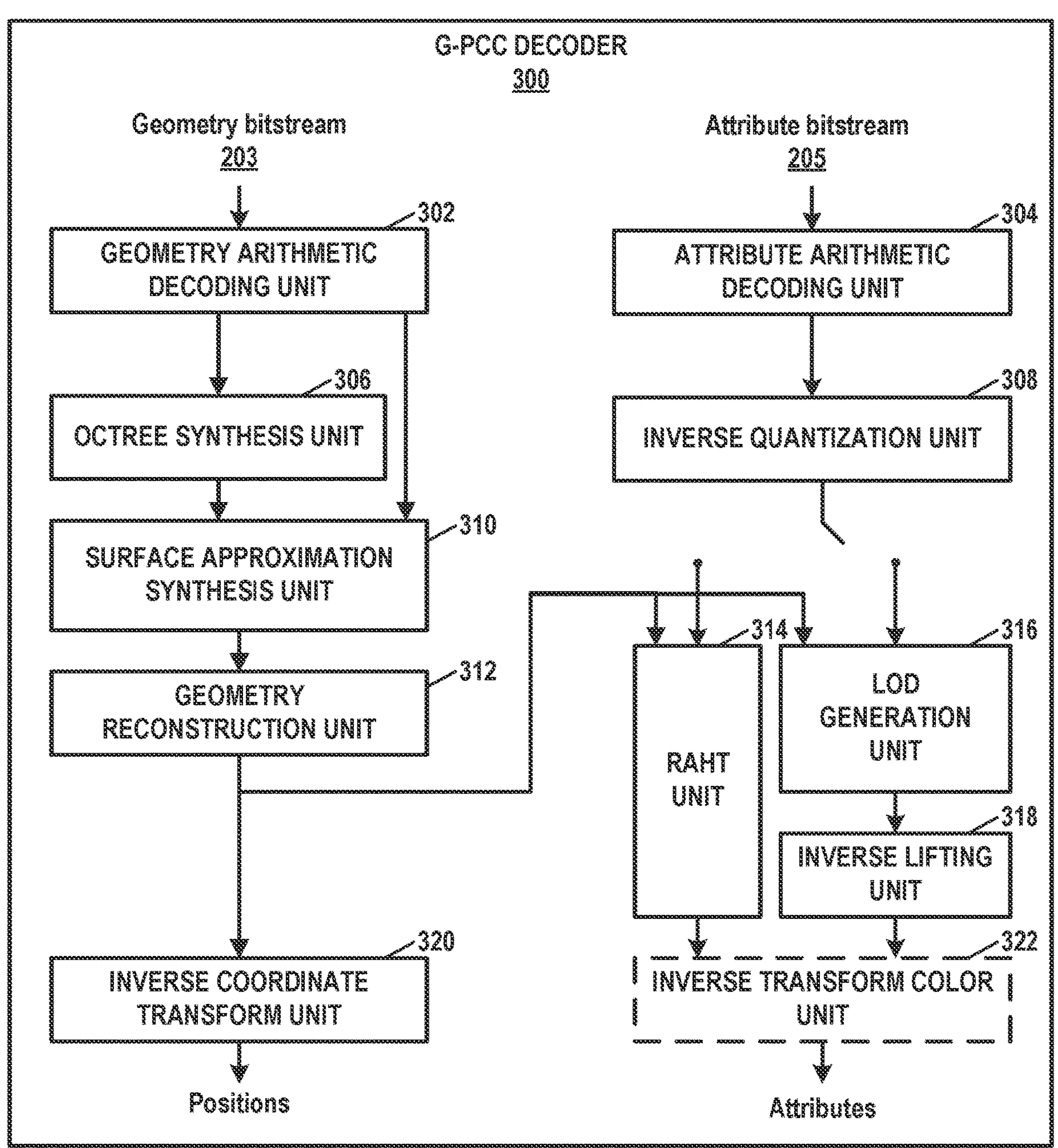
FIG. 3 is a block diagram illustrating an example G-PCC decoder.

FIG. 2 provides an overview of G-PCC encoder 200. FIG. 3 provides an overview of G-PCC decoder 300. The modules shown are logical, and do not necessarily correspond one-to-one to implemented code in the reference implementation of G-PCC codec, i.e., TMC13 test model software studied by ISO/IEC MPEG (JTC 1/SC 29/WG 11).

In both G-PCC encoder 200 and G-PCC decoder 300, point cloud positions are coded first. Attribute coding depends on the decoded geometry. In FIG. 2 and FIG. 3, the gray-shaded modules are options typically used for Category 1 data. Diagonal-crosshatched modules are options typically used for Category 3 data. All the other modules are common between Categories 1 and 3.

For Category 3 data, the compressed geometry is typically represented as an octree from the root all the way down to a leaf level of individual voxels. For Category 1 data, the compressed geometry is typically represented by a pruned octree (i.e., an octree from the root down to a leaf level of blocks larger than voxels) plus a model that approximates the surface within each leaf of the pruned octree. In this way, both Category 1 and 3 data share the octree coding mechanism, while Category 1 data may in addition approximate the voxels within each leaf with a surface model. The surface model used is a triangulation comprising 1-10 triangles per block, resulting in a triangle soup.

At each node of an octree, an occupancy is signaled (when not inferred) for one or more of its child nodes (up to eight nodes). Multiple neighborhoods are specified including (a) nodes that share a face with a current octree node, (b) nodes that share a face, edge or a vertex with the current octree node, etc. Within each neighborhood, the occupancy of a node and/or its children may be used to predict the occupancy of the current node or its children. For points that are sparsely populated in certain nodes of the octree, the codec (e.g., as implemented by G-PCC encoder 200 or G-PCC decoder 300) also supports a direct coding mode where the 3D position of the point is encoded directly. A flag may be signaled to indicate that a direct mode is signaled. At the lowest level, the number of points associated with the octree node/leaf node may also be coded.

Once the geometry is coded, the attributes corresponding to the geometry points are coded. When there are multiple attribute points corresponding to one reconstructed/decoded geometry point, an attribute value may be derived that is representative of the reconstructed point.

There are three attribute coding methods in G-PCC: Region Adaptive Hierarchical Transform (RAHT) coding, interpolation-based hierarchical nearest-neighbour prediction (Predicting Transform), and interpolation-based hierarchical nearest-neighbour prediction with an update/lifting step (Lifting Transform). RAHT and Lifting are typically used for Category 1 data, while Predicting is typically used for Category 3 data. However, either method may be used for any data, and, just like with the geometry codecs in G-PCC, the attribute coding method used to code the point cloud is specified in the bitstream.

The coding of the attributes may be conducted in a level-of-detail (LOD), where with each level of detail a finer representation of the point cloud attribute may be obtained. Each level of detail may be specified based on distance metric from the neighboring nodes or based on a sampling distance.

At G-PCC encoder 200, the residuals obtained as the output of the coding methods for the attributes are quantized. The residuals may be obtained by subtracting the attribute value from a prediction that is derived based on the points in the neighborhood of the current point and based on the attribute values of points encoded previously. The quantized residuals may be coded using context adaptive arithmetic coding.

In the example of FIG. 2, G-PCC encoder 200 may include a coordinate transform unit 202, a color transform unit 204, a voxelization unit 206, an attribute transfer unit 208, an octree analysis unit 210, a surface approximation analysis unit 212, an arithmetic encoding unit 214, a geometry reconstruction unit 216, an RAHT unit 218, a LOD generation unit 220, a lifting unit 222, a coefficient quantization unit 224, and an arithmetic encoding unit 226.

As shown in the example of FIG. 2, G-PCC encoder 200 may obtain a set of positions of points in the point cloud and a set of attributes. G-PCC encoder 200 may obtain the set of positions of the points in the point cloud and the set of attributes from data source 104 (FIG. 1). The positions may include coordinates of points in a point cloud. The attributes may include information about the points in the point cloud, such as colors associated with points in the point cloud. G-PCC encoder 200 may generate a geometry bitstream 203 that includes an encoded representation of the positions of the points in the point cloud. G-PCC encoder 200 may also generate an attribute bitstream 205 that includes an encoded representation of the set of attributes.

Coordinate transform unit 202 may apply a transform to the coordinates of the points to transform the coordinates from an initial domain to a transform domain. This disclosure may refer to the transformed coordinates as transform coordinates. Color transform unit 204 may apply a transform to transform color information of the attributes to a different domain. For example, color transform unit 204 may transform color information from an RGB color space to a YCbCr color space.

Furthermore, in the example of FIG. 2, voxelization unit 206 may voxelize the transform coordinates. Voxelization of the transform coordinates may include quantization and removing some points of the point cloud. In other words, multiple points of the point cloud may be subsumed within a single "voxel," which may thereafter be treated in some respects as one point. Furthermore, octree analysis unit 210 may generate an octree based on the voxelized transform coordinates. Additionally, in the example of FIG. 2, surface approximation analysis unit 212 may analyze the points to potentially determine a surface representation of sets of the points. Arithmetic encoding unit 214 may entropy encode syntax elements representing the information of the octree and/or surfaces determined by surface approximation analysis unit 212. Octree analysis unit 210 and arithmetic encoding unit 214 may together form a geometry coding unit. In some examples, octree analysis unit 210 may perform inter prediction and/or intra prediction. G-PCC encoder 200 may output these syntax elements in geometry bitstream 203. Geometry bitstream 203 may also include other syntax elements, including syntax elements that are not arithmetically encoded.

Geometry reconstruction unit 216 may reconstruct transform coordinates of points in the point cloud based on the octree, data indicating the surfaces determined by surface approximation analysis unit 212, and/or other information. The number of transform coordinates reconstructed by geometry reconstruction unit 216 may be different from the original number of points of the point cloud because of voxelization and surface approximation. This disclosure may refer to the resulting points as reconstructed points. Attribute transfer unit 208 may transfer attributes of the original points of the point cloud to reconstructed points of the point cloud.

Furthermore, RAHT unit 218 may apply RAHT coding to the attributes of the reconstructed points. In some examples, under RAHT, the attributes of a block of 2×2×2 point positions are taken and transformed along one direction to obtain four low (L) and four high (H) frequency nodes. Subsequently, the four low frequency nodes (L) are transformed in a second direction to obtain two low (LL) and two high (LH) frequency nodes. The two low frequency nodes (LL) are transformed along a third direction to obtain one low (LLL) and one high (LLH) frequency node. The low frequency node LLL corresponds to DC coefficients and the high frequency nodes H, LH, and LLH correspond to AC coefficients. The transformation in each direction may be a 1-D transform with two coefficient weights. The low frequency coefficients may be taken as coefficients of the 2×2×2 block for the next higher level of the RAHT transform and the AC coefficients are encoded without changes; such transformations continue until the top root node. The tree traversal for encoding is from top to bottom used to calculate the weights to be used for the coefficients; the transform order is from bottom to top. The coefficients may then be quantized and coded.

Alternatively or additionally, LOD generation unit 220 and lifting unit 222 may apply LOD processing and lifting, respectively, to the attributes of the reconstructed points. LOD generation is used to split the attributes into different refinement levels. Each refinement level provides a refinement to the attributes of the point cloud. The first refinement level provides a coarse approximation and contains few points; the subsequent refinement level typically contains more points, and so on. The refinement levels may be constructed using a distance-based metric or may also use one or more other classification criteria (e.g., subsampling from a particular order). Thus, all the reconstructed points may be included in a refinement level. Each level of detail is produced by taking a union of all points up to particular refinement level: e.g., LOD1 is obtained based on refinement level RL1, LOD2 is obtained based on RL1 and RL2, . . . and LODN is obtained by union of RL1, RL2, . . . RLN. In some cases, LOD generation may be followed by a prediction scheme (e.g., predicting transform) where attributes associated with each point in the LOD are predicted from a weighted average of preceding points, and the residual is quantized and entropy coded. The lifting scheme builds on top of the predicting transform mechanism, where an update operator is used to update the coefficients and an adaptive quantization of the coefficients is performed.

RAHT unit 218 and lifting unit 222 may generate coefficients based on the attributes. Coefficient quantization unit 224 may quantize the coefficients generated by RAHT unit 218 or lifting unit 222. Arithmetic encoding unit 226 may apply arithmetic coding to syntax elements representing the quantized coefficients. G-PCC encoder 200 may output these syntax elements in attribute bitstream 205. Attribute bitstream 205 may also include other syntax elements, including non-arithmetically encoded syntax elements.

In the example of FIG. 3, G-PCC decoder 300 may include a geometry arithmetic decoding unit 302, an attribute arithmetic decoding unit 304, an octree synthesis unit 306, an inverse quantization unit 308, a surface approximation synthesis unit 310, a geometry reconstruction unit 312, a RAHT unit 314, a LoD generation unit 316, an inverse lifting unit 318, an inverse transform coordinate unit 320, and an inverse transform color unit 322.

G-PCC decoder 300 may obtain a geometry bitstream 203 and attribute bitstream 205. Geometry arithmetic decoding unit 302 of decoder 300 may apply arithmetic decoding (e.g., Context-Adaptive Binary Arithmetic Coding (CABAC) or other type of arithmetic decoding) to syntax elements in geometry bitstream 203. Similarly, attribute arithmetic decoding unit 304 may apply arithmetic decoding to syntax elements in attribute bitstream 205.

Octree synthesis unit 306 may synthesize an octree based on syntax elements parsed from geometry bitstream 203. Octree synthesis unit 306, together with geometry arithmetic decoding unit 302 may form a geometry decoding unit of G-PCC decoder 300. Starting with the root node of the octree, the occupancy of each of the eight children node at each octree level is signaled in the bitstream. When the signaling indicates that a child node at a particular octree level is occupied, the occupancy of children of this child node is signaled. The signaling of nodes at each octree level is signaled before proceeding to the subsequent octree level. At the final level of the octree, each node corresponds to a voxel position; when the leaf node is occupied, one or more points may be specified to be occupied at the voxel position. In some instances, some branches of the octree may terminate earlier than the final level due to quantization. In such cases, a leaf node is considered an occupied node that has no child nodes. In some examples, octree synthesis unit 306 may perform inter prediction and/or intra prediction. In instances where surface approximation is used in geometry bitstream 203, surface approximation synthesis unit 310 may determine a surface model based on syntax elements parsed from geometry bitstream 203 and based on the octree. In some examples, inter prediction may be part of the process performed by surface approximation synthesis unit 310 to determine a surface model.

Furthermore, geometry reconstruction unit 312 may perform a reconstruction to determine coordinates of points in a point cloud. For each position at a leaf node of the octree, geometry reconstruction unit 312 may reconstruct the node position by using a binary representation of the leaf node in the octree. At each respective leaf node, the number of points at the respective leaf node is signaled; this indicates the number of duplicate points at the same voxel position. When geometry quantization is used, the point positions are scaled for determining the reconstructed point position values.

Inverse transform coordinate unit 320 may apply an inverse transform to the reconstructed coordinates to convert the reconstructed coordinates (positions) of the points in the point cloud from a transform domain back into an initial domain. The positions of points in a point cloud may be in floating point domain but point positions in G-PCC codec are coded in the integer domain. The inverse transform may be used to convert the positions back to the original domain.

Additionally, in the example of FIG. 3, inverse quantization unit 308 may inverse quantize attribute values. The attribute values may be based on syntax elements obtained from attribute bitstream 205 (e.g., including syntax elements decoded by attribute arithmetic decoding unit 304).

Depending on how the attribute values are encoded, RAHT unit 314 may perform RAHT coding to determine, based on the inverse quantized attribute values, color values for points of the point cloud. RAHT decoding is done from the top to the bottom of the tree. At each level, the low and high frequency coefficients that are derived from the inverse quantization process are used to derive the constituent values. At the leaf node, the values derived correspond to the attribute values of the coefficients. The weight derivation process for the points is similar to the process used at G-PCC encoder 200. Alternatively, LOD generation unit 316 and inverse lifting unit 318 may determine color values for points of the point cloud using a level of detail-based technique. LOD generation unit 316 decodes each LOD giving progressively finer representations of the attribute of points. With a predicting transform, LOD generation unit 316 derives the prediction of the point from a weighted sum of points that are in prior LODs, or previously reconstructed in the same LOD. LOD generation unit 316 may add the prediction to the residual (which is obtained after inverse quantization) to obtain the reconstructed value of the attribute. When the lifting scheme is used, LOD generation unit 316 may also include an update operator to update the coefficients used to derive the attribute values. LOD generation unit 316 may also apply an inverse adaptive quantization in this case.

Furthermore, in the example of FIG. 3, inverse transform color unit 322 may apply an inverse color transform to the color values. The inverse color transform may be an inverse of a color transform applied by color transform unit 204 of encoder 200. For example, color transform unit 204 may transform color information from an RGB color space to a YCbCr color space. Accordingly, inverse color transform unit 322 may transform color information from the YCbCr color space to the RGB color space.

The various units of FIG. 2 and FIG. 3 are illustrated to assist with understanding the operations performed by encoder 200 and decoder 300. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Angular coding mode enhances the coding efficiency of the planar mode by using the sensor characteristics of a typical LiDAR sensor. The angular coding mode is optionally used together with the planar mode and improves the coding of the vertical (z) plane position syntax element by employing knowledge of positions and angles of sensing laser beams in a typical LiDAR sensor. Furthermore, the angular coding mode can optionally be used to improve the coding of vertical z-position bits in inferred direct coding mode (IDCM).

The azimuthal coding mode is similar to the angular mode and extends the angular mode to the coding of the (x) and (y) plane position syntax elements of the planar mode and improves the coding of the x- or y-position bits in IDCM. "Angular mode" may also refer to azimuthal mode in sections below.

Inter prediction is a technique that takes advantage of redundances between different frames of point cloud data. Some redundancies between frames of point cloud data are the result of translational or rotational motion of objects relative to sensors generating the point cloud data. Motion parameters may be used to characterize such motion. In some examples, there are two kinds of motion parameters involved in G-PCC: global motion parameters and a local node motion vector. Global motion parameters are defined as a rotation matrix and translation vector, which will be applied on all the points in a prediction (reference) frame. A local node motion vector of a node of the octree is a motion vector that is only applied on points within the node in the prediction (reference) frame. Details of an example motion estimation algorithm are described below.

Figure 4:
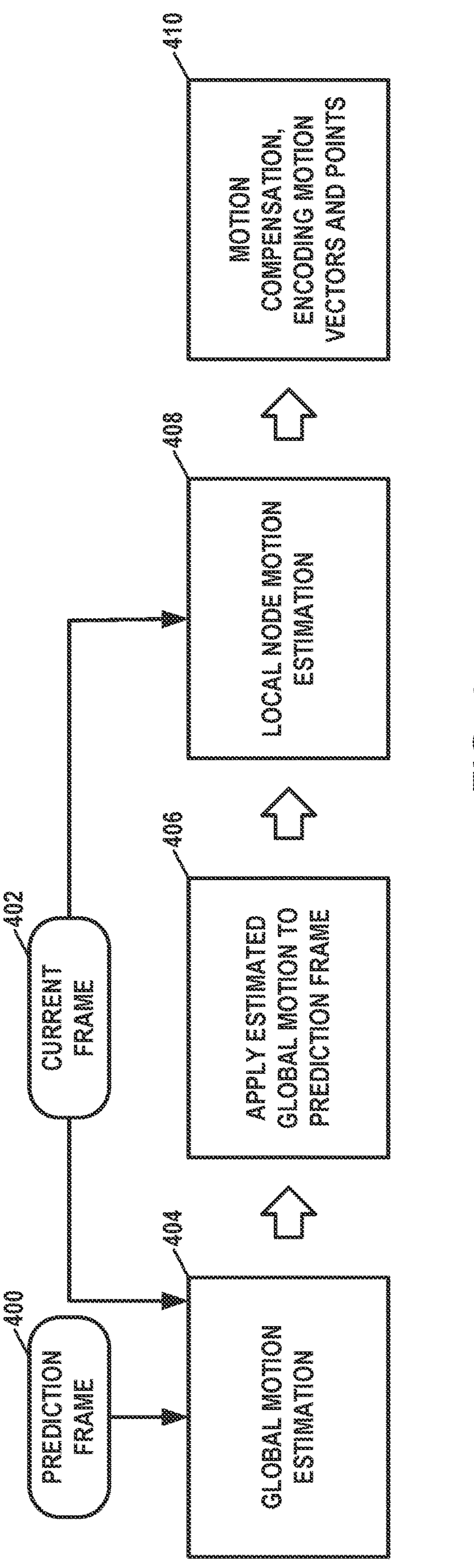
FIG. 4 is a flowchart showing an example motion estimation algorithm.

FIG. 4 is a flowchart showing an example motion estimation algorithm. Given an input prediction (reference) frame 400 and a current frame 402, G-PCC encoder 200 may estimate global motion first at a global scale (404). Each of prediction frame 400 and current frame 402 represents a point cloud. In other words, each of prediction frame 400 and current frame 402 comprises distinct point cloud data. Current frame 402 may represent a point cloud that G-PCC encoder 200 is currently encoding. Prediction frame 400 may represent a point cloud that G-PCC encoder 200 has previously reconstructed. The point cloud represented by prediction frame 400 may correspond to an earlier time than the point cloud represented by current frame 402.

After estimating global motion, G-PCC encoder 200 may apply the estimated global motion to prediction frame 400 (406). In other words, G-PCC encoder 200 may perform motion compensation on prediction frame 400 based on the estimated global motion. For instance, G-PCC encoder 200 may rotate or translate points in prediction frame 400 based on the estimated block motion. G-PCC encoder 200 may estimate the global motion based on a comparison of prediction frame 400 and current frame 402.

After applying global motion on prediction, G-PCC encoder 200 may estimate local motion at a finer scale, i.e., at a node level in an octree. In other words, G-PCC encoder 200 may perform local node motion estimation (408). For example, G-PCC encoder 200 may determine, for individual nodes, whether to perform motion compensation for the node based on the original version of prediction frame 400 or the version of prediction frame 400 to which global motion compensation has been applied. In some examples, as part of performing local node motion estimation, G-PCC encoder 200 may determine a motion vector for a node.

G-PCC encoder 200 may apply the estimated local node motion in motion compensation (410). Applying the estimated location node motion may generate predicted positions of points in the node. In other words, G-PCC encoder 200 may perform motion compensation on the nodes based on local node motion estimation. G-PCC encoder 200 may encode the points in the node based on the predicted positions of the points of the node. For instance, G-PCC encoder 200 may encode data indicating displacements between points of the node and corresponding predicted points of the node. G-PCC encoder 200 may also encode the motion vector of a node, if present.

For purposes of inter prediction, a point cloud may be split into largest prediction units (LPUs). An LPU may be recursively partitioned into sub-prediction units (PUs), thus forming a prediction tree. The "nodes" mentioned with reference to FIG. 4 may be LPUs or PUs.

In some examples, there are two coding modes for an LPU, including vehicle LPU and world LPU. In other words, each LPU may be either a vehicle LPU or a world LPU. The terms "vehicle LPU" and "world LPU" arise from a use case in which point cloud data is generated by sensors on a moving vehicle, such as an autonomous vehicle. In general, points of the point cloud data that represent the vehicle itself do not move relative to the position of the sensors because the sensors are at fixed positions on the vehicle. Similarly, points representing the road on which the vehicle is traveling tend not to change much from frame to frame (e.g., because roads are typically flat and smooth). On the other hand, points of the point cloud data that represent other objects in the world beyond the vehicle and road do move relative to the position of the sensors. Accordingly, there may be coding efficiencies associated with performing inter prediction differently for points that represent the vehicle and points that represent objects in the world.

Regardless of whether an LPU is a vehicle LPU or a world LPU, all PUs in an LPU are predicted using the same reference frame. The reference frame used to predict the PUs in vehicle LPUs is the previously reconstructed point cloud, where the reference frame used to predict the PUs in world LPU is the compensated point cloud of the previously reconstructed point cloud using the global motion. This is because the sensors may have a fixed position on the vehicle and points in the point cloud data representing the vehicle do not rotate or translate relative to the sensors. Conversely, the sensors may rotate or translate relative to the world. Therefore, it may be more efficient to encode points representing the vehicle without application of global motion estimation and to encode points representing the world with application of global motion estimation.

In some examples, the reference frame used to predict the PUs in a vehicle LPU or a world LPU may be a frame that was generated using thresholds. These thresholds may be used to segment the point cloud into road and objects. If a point's vertical coordinate is in between the two thresholds, the point is classified as road. G-PCC encoder 200 may partition the point cloud into one or more vehicle LPUs and one or more world LPUs based on amounts of motion in different areas of the point cloud data. If the estimated motion of a LPU is above a threshold, G-PCC encoder 200 may classify the LPU as a world LPU. Otherwise, G-PCC encoder 200 may classify the LPU as a vehicle LPU. In this example, the global motion is applied to the object points and zero motion is applied to road points (e.g., points representing the road on which the vehicle is traveling) to generate the reference frame.

Figure 5:
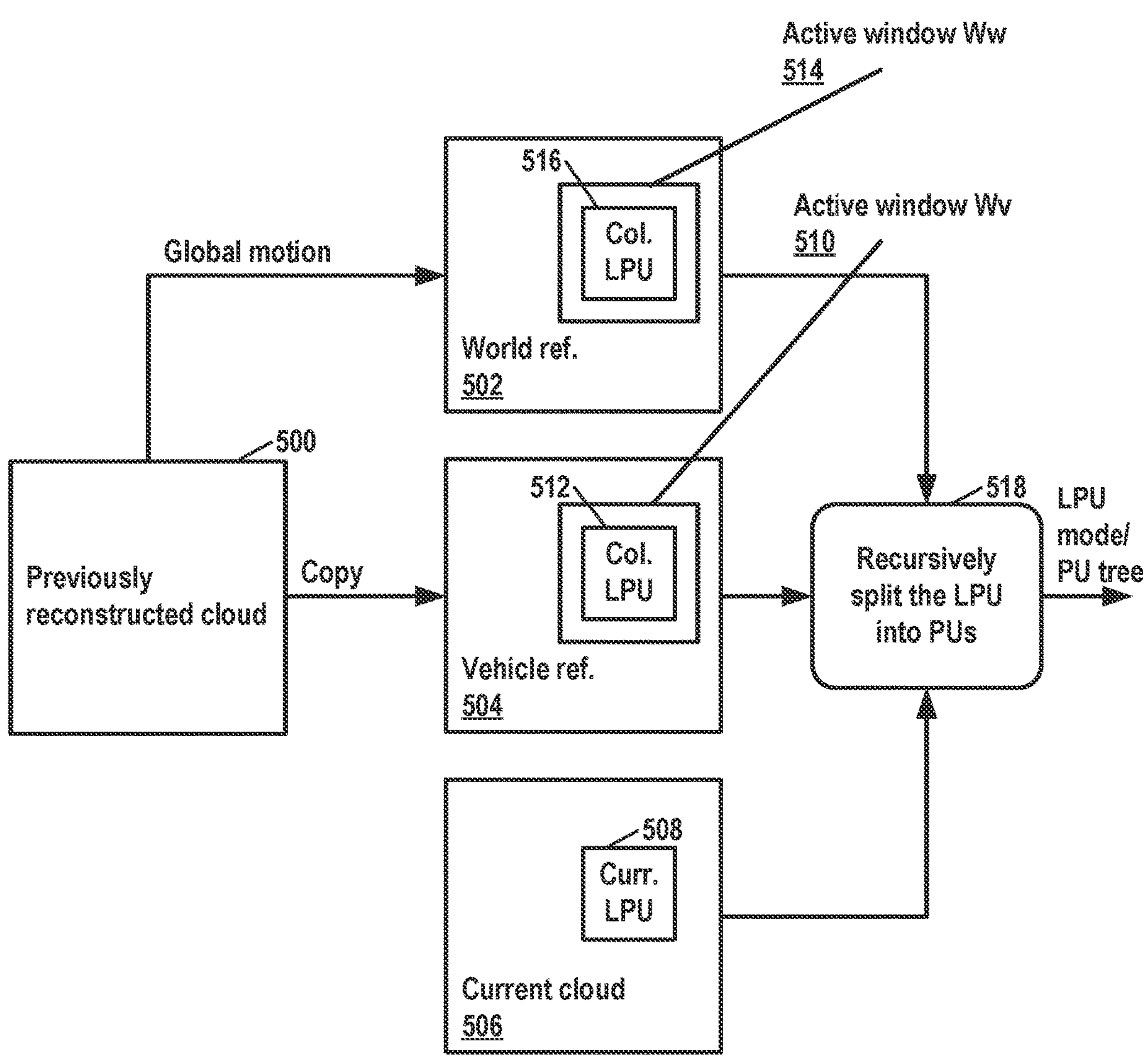
FIG. 5 is a conceptual diagram illustrating an example of splitting of a Largest Prediction Unit (LPU) into a Prediction Unit (PU) tree.

FIG. 5 is a conceptual diagram illustrating an example of splitting of a Largest Prediction Unit (LPU) into a Prediction Unit (PU) tree. In other words, the partitioning process of an LPU into a PU tree is illustrated in FIG. 5. In the example of FIG. 5, G-PCC encoder 200 has previously reconstructed a frame 500 representing a point cloud (shown in FIG. 5 as "previously reconstructed cloud"). G-PCC encoder 200 may apply global motion compensation to frame 500 to generate a world reference frame 502. A vehicle reference frame 504 may simply be a copy of frame 500.

Furthermore, in the example of FIG. 5, G-PCC encoder 200 is encoding a current frame 506 (shown FIG. 5 as "current cloud"). Current frame 506 includes a current LPU 508. G-PCC encoder 200 may search a window 510 (e.g., active window Wv) surrounding a collocated LPU 512 in vehicle reference frame 504 for points corresponding to points in current LPU 508. Additionally, G-PCC encoder 200 may search a window 514 (e.g., active window Ww) surrounding collocated LPU 516 in world reference frame 502 for points corresponding to points in current LPU 508. Collocated LPU 512 and collocated LPU 516 are collocated with current LPU 508. Thus, an active window is the extension area of the collocated reference LPU in the reference frame. G-PCC encoder 200 may determine whether the points in window 510 or window 514 are a better match to the points in current LPU 508. If the points in window 510 are a better match, G-PCC encoder 200 may classify current LPU 508 as a vehicle LPU. If the points in window 510 are a better match, G-PCC encoder 200 may classify current LPU 508 as a world LPU. All the points in the active windows are used to decide the LPU mode using a distortion comparison.

After classifying current LPU 508, G-PCC encoder 200 may recursively split current LPU 508 into PUs (i.e., sub-PUs) (518). The split of an LPU into the sub-PUs starts from depth 0 or LPU level to the maximum depth (or when the PU size achieves the smallest allowed size—MinPUsize). The split at each depth is decided using a rate-distortion optimization process. The rate-distortion cost with no split is calculated first. The motion search is conducted to find the best motion which has the minimal distortion between the current PU and the corresponding PU in the reference frame. The rate-distortion cost with no split is derived using the distortion and the signaling overhead of the motion. When the rate-distortion cost with no split is obtained, G-PCC encoder 200 may test splitting the PU into 8 child nodes in the next depth. The rate-distortion cost with the split is the summation of the cost of the 8 child nodes. The costs with split and no split are compared to decide whether the PU is split or not. The following information may be signaled to G-PCC decoder 300 for current LPU 508. Firstly, the LPU type is encoded. The LPU type may indicate whether the LPU is a vehicle LPU or a world LPU. Then, the split of PUs of current LPU 508 in each depth of the PU tree is signaled. If a PU is not split, G-PCC encoder 200 may signal the associated motion (i.e., the motion associated with the PU).

In some examples, the inter prediction is used in occupancy coding, including planar mode coding with angular mode disabled. In other words, inter prediction may be used in a process of encoding whether a node in a geometry octree is occupied by one or more points. In some examples, a reference node is the collocated node in the reference frame which is derived by compensating the prediction frame using the global motion. When the reference node is obtained, it is split into 8 cubic child nodes with the same size.

Points in each child node of the reference node are counted to form the inter prediction occupancy (predOccupancy) and the prediction occupancy strong (predOccupancyStrong). If there is at least one point in a child node, the corresponding bit (out of 8 bits) in predOccupancy is set equal to 1. Otherwise, the corresponding bit is set equal to 0. On the other hand, if the number of points in a child node is larger than 2, the corresponding bit in predOccupancyStrong is set equal to 1; otherwise, this bit is set equal to 0.

Figure 6:
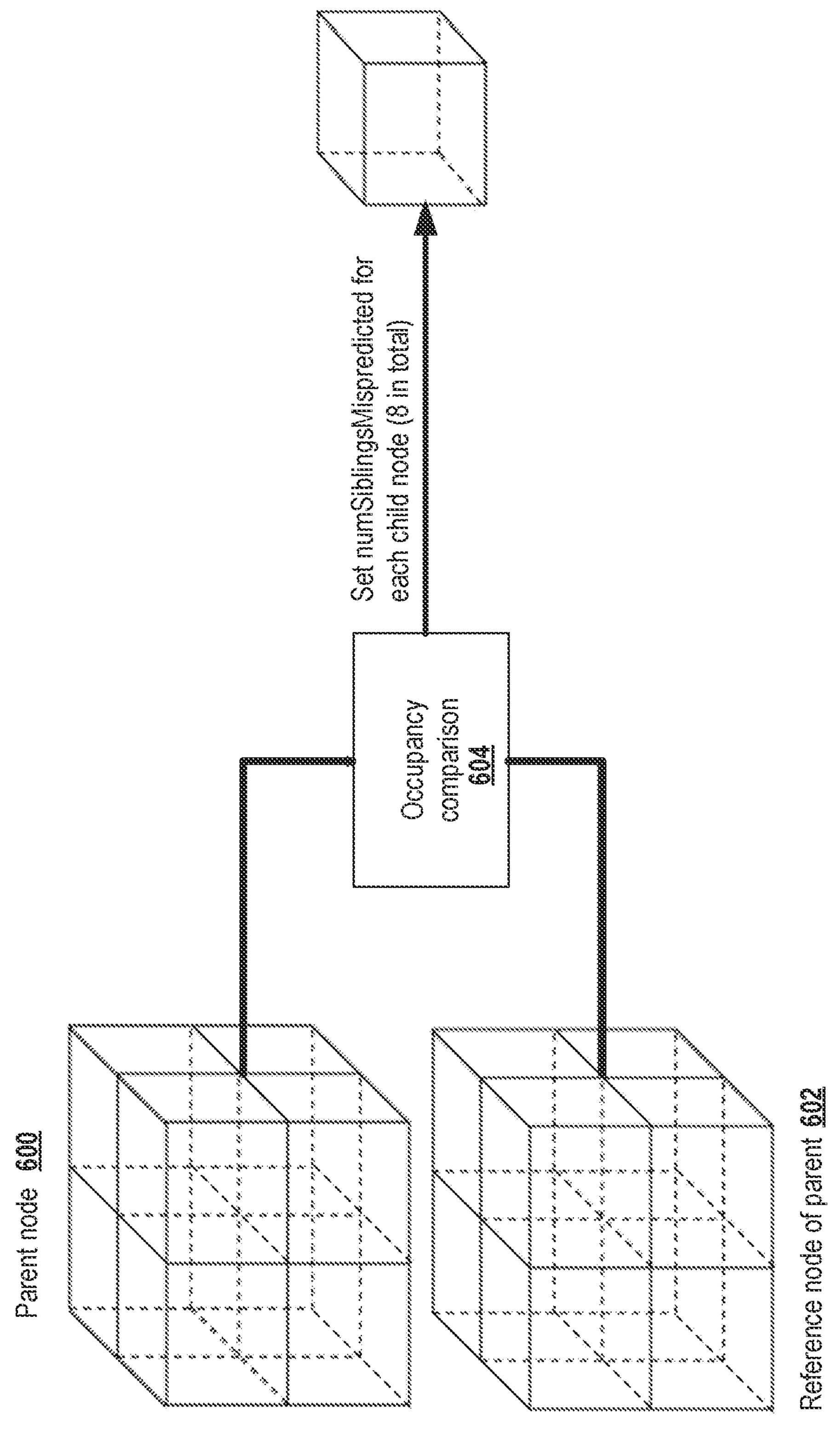
FIG. 6 is a conceptual diagram illustrating occupancies of parent node and reference node of parent node to obtain a number of mispredicted siblings.

The quality of the inter prediction is then evaluated by a parameter called 'occupancyIsPredictable'. The value of occupancyIsPredictable of a node is derived by the number of siblings missed predictions. The number of siblings missed predictions (e.g., numSiblingsMispredicted) is calculated by comparing the occupancy of the parent node with the occupancy of the parent's reference node, as illustrated in FIG. 6. If the predOccupancy of the current node is 0 or the number of the number of siblings missed predictions is larger than 5, occupancyIsPredictable is set equal to 0. Otherwise, occupancyIsPredictable is set equal to 1.

FIG. 6 is a conceptual diagram illustrating occupancies of a parent node 600 and a reference node 602 of parent node 600 to obtain a number of mispredicted siblings. In the example of FIG. 6, G-PCC encoder 200 or G-PCC decoder 300 may compare occupancy of parent node 600 and reference node 602 to obtain a number of mispredicted/missed siblings (e.g., numSiblingsMispredicted) (604). If an occupancy bit of a child node in parent node 600 and the occupancy bit of the corresponding node in reference node 602 are different, this child node is considered as mispredicted.

G-PCC encoder 200 or G-PCC decoder 300 may update occupancyIsPredictable to update predOccupancy, predOccupancyStrong, planar copy mode eligibility and IDCM eligibility. If occupancyIsPredictable is equal to 0, predOccupancy, predOccupancyStrong, and planar copy mode eligibility are set equal to 0. If occupancyIsPredictable is 1, IDCM is disabled for this node in current InterEM.

If a node is encoded using planar copy mode (PCM), G-PCC encoder 200 does not signal the planar information of this node to G-PCC decoder 300. Rather, G-PCC encoder 200 and G-PCC decoder copy the planar mode and plane position in three directions of PCM coded node from the planar information of reference node 602, which is generated from predOccupancy.

Figures 7A, 7B:
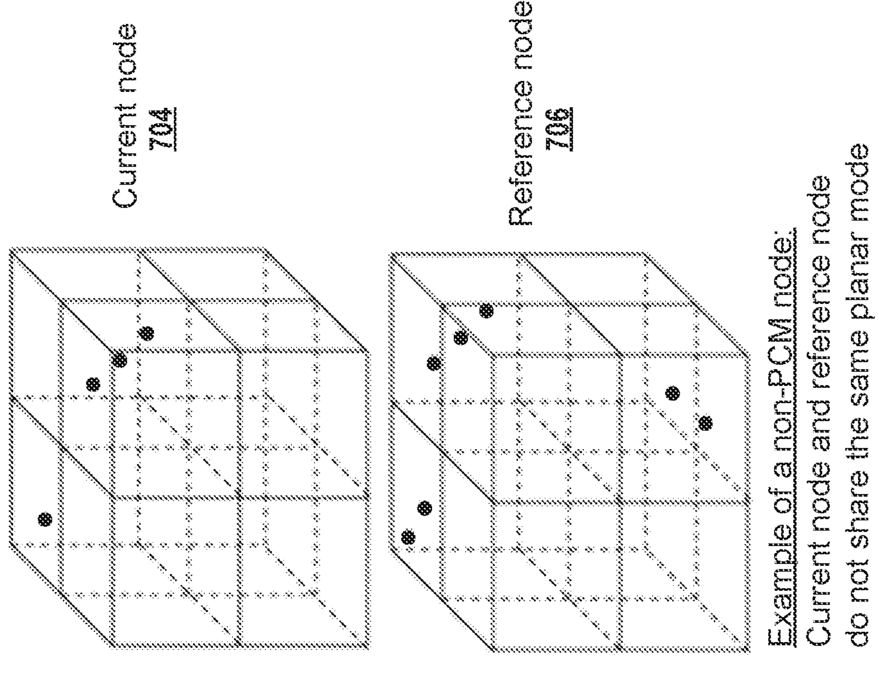
FIG. 7A and FIG. 7B are conceptual diagrams illustrating examples of planar copy mode (PCM) mode and non-PCM mode.

Examples of PCM node and non-PCM node are illustrated in FIG. 7A and FIG. 7B, respectively. In other words, FIG. 7A and FIG. 7B are conceptual diagrams illustrating examples of PCM mode and non-PCM mode. In the example of FIG. 7A, a current node 700 only has points in the upper blocks and a reference node 702 also only has points in the upper blocks. Thus, current node 700 and reference node 702 may share the same planar mode and plane positions in three dimensions. In FIG. 7B, a current node 704 only has points in the upper blocks. However, in FIG. 7B, a reference node 706 for current node 704 has points in upper and lower blocks. Thus, in FIG. 7B, current node 704 and reference node 706 do not share the planar mode and plane position in three dimensions. For a non-PCM coded node, the planar information of the reference node is used to provide more flexibility in the context selection of planar mode and plane position coding.

In some examples, the inter prediction is used to improve occupancy coding. For instance, inter prediction may be used in context selection to encode occupancy bits of the current node. This is presented in:

---

```
GeometryOctreeEncoder::encodeOccupancyNeighNZ( ) and
GeometryOctreeEncoder::encodeOccupancyNeighZ( ) functions as
follows:
// This part is to encode the occupancy bit of a child node of the current
node.
```

-continued

```
int ctxIdxMapIdx = 4 * idxAdj; // This part is obtained using the
occupancy of adjacent nodes
ctxIdxMapIdx = 4 * idxAdj + bitIsPredicted + bitPrediction // Intra
prediction
    + !!mappedPred + bitPred + bitPredStrong;   // Inter prediction
  ...
  auto& ctxIdxMap = _ctxIdxMaps[ctxIdxMapIdx];
  ctxIdx = ctxIdxMap.evolve(bit, &ctxIdxMap[i][numOccupiedAcc]);
  _arithmeticEncoder->encode(bit, _ctxOccupancy[ctxIdx]);
```

In the code above, idxAdj is decided using the occupancy of the adjacent nodes. bitIsPredicted and bitPrediction are the occupancy bits derived using intra prediction. In the inter frame, these parameters are set equal to 0. !!mappedPred indicates whether the prediction occupancy of the inter reference block is zero or not. ctxIdxMaps contains context map addresses. bitPred and bitPredStrong are corresponding bits of the child node in the predOccupancy and predOccupancyStrong. In the code above, the evolve function computes a context index to be used for coding a bit value.

There may be one or more problems with certain implementations of G-PCC, including problems in partitioning and in signaling of motion information for PUs. For instance, in partitioning, an LPU may be a cubic node where the sizes of the node in three directions are identical. However, it may not align with the size of the node when the point cloud is split using QT-BT (quadtree, binary tree) partitioning, or when the node is located along the border of the point cloud. In signaling of motion information for PUs, the value of translation motion of a PU is directly signaled. It should be noted that, the motion of the current PU may have high correlation with the sibling PUs or the parent PU. Therefore, motion prediction coding may have better performance compared to directly signaling the motion value. In addition, in one example implementation of G-PCC, when a PU is not split, the motion is always signaled. In some cases, there are no points in the collocated PU in the reference frame to perform motion compensation. Signaling the motion in these cases is redundant. This disclosure discloses several techniques to solve the above problems.

In accordance with techniques of this disclosure, an LPU may have different sizes in different directions, defined as {lpuX, lpuY, lpuZ} where lpuX, lpuY, lpuZ are the positive numbers. For example, the LPUs may have a first size in a first direction (e.g., x, y, or z direction) and the LPUs may have a second size different from the first size in a second direction. In one example, the LPU size may align with the QT-BT split of a cloud that is determined by octree geometry coding.

Thus, G-PCC encoder 200 may determine that the point cloud data is split into a plurality of LPUs, where at least two of the LPUs have different sizes along different directions. In this disclosure, a point cloud may refer to a complete point cloud or a portion of a point cloud. G-PCC encoder 200 may perform inter prediction to determine predicted points for the LPUs. G-PCC encoder 200 may encode points within the LPUs based on the predicted points for the LPUs. Similarly, G-PCC decoder 300 may determine that the point cloud data is split into a plurality of LPUs, where at least two of the LPUs have different sizes along different directions. G-PCC decoder 300 may perform inter prediction to determine predicted points for the LPUs. G-PCC decoder 300 may reconstruct points within the LPUs based on the predicted points for the LPUs.

A cloud may be flexibly split into LPUs for inter prediction. For example, the splitting of a point cloud into LPUs may be controlled by one or more parameters described below.

For each dimension (i.e., x, y, and z), an indication whether splitting occurs along the dimension may be signaled. For example, a flag (e.g., split_lpu_x) may be signaled for the x dimension. In this example, split_lpu_x equal to 1 indicates that the point cloud may be split along the x dimension to generate LPUs; split_lpu_x equal to 0 indicates that the point cloud is not split along the x-dimension to generate LPUs. Similar flags (e.g., split_lpu_y and split_lpu_z) may be signaled for the y and z dimensions.

In some examples, for each dimension (i.e., x, y, and z), an LPU size along the dimension may be pre-determined or signaled. The LPUs size along a dimension may be specified in terms of a number of voxels, a logarithm of the number of voxels, or on another way. For example, a syntax element (e.g., LPU_size_x) may be specified to indicate the LPU size along the x dimension. Similar syntax elements (e.g., LPU_size_y and LPU_size_z) may be signaled for the y and z dimensions. In this example, the syntax elements LPU_size_x, LPU_size_y, and LPU_size_z may have different values.

In some examples, the LPU size along a dimension may be signaled only when splitting along that dimension is specified or indicated is enabled. For example, only when split_lpu_x indicates that split along x-dimension may be enabled, LPU_size_x may be signaled to indicate the size of the LPU along the x dimension. Furthermore, in some examples, the logarithm of the LPU size along each dimension may be signaled in place of the LPU size. For instance, if the value of LPU size along x direction is k, the signaled value is $\log_2(k)$.

In some examples, for each dimension (i.e., x, y, and z), the value of LPU size along the dimension may be used to indicate (a) whether splitting is enabled along the dimension, and also (b) the size of the LPU along the dimension. For example, LPU_size_x equal to 0 may specify that the point cloud is not split along the x dimension to generate LPUs; LPU_size_x greater than 0 may specify that the point cloud is split along the x dimension to generate LPUs, and that the size of the LPUs along the x-dimension is LPU_size_x. The same semantics may apply with respect to LPU_size_y and LPU_size_z.

Thus, in such examples, G-PCC encoder 200 may, for at least one direction of an x, y, and z direction, signal a syntax element indicating whether splitting of the point cloud data is enabled in the direction and a size of the LPUs along the direction. G-PCC decoder 300 may, for at least one direction of an x, y, and z direction, obtain a syntax element indicating both whether splitting of the point cloud data is enabled in the direction and a size of the LPUs along the direction.

In some examples, when splitting is not enabled along a dimension, G-PCC encoder 200 and G-PCC decoder 300 may infer the value of LPU size along the dimension to be equal to the size of the point cloud along the dimension. For instance, when the size of the point cloud is PC_size_x, PC_size_y, PC_size_z along the x, y, z dimensions, respectively, and split_lpu_x is equal to 0, G-PCC encoder 200 and G-PCC decoder 300 may infer the value of LPU_size_x to be equal to PC_size_x. Similar examples may apply with respect to split_lpu_y, PC_size_y, and LPU_size_y, and with respect to split_lpu_z, PC_size_z, and LPU_size_z. Thus, in such examples, G-PCC decoder 300 may determine that splitting of the point cloud data is not enabled along at least one direction of a x, y, or z direction, and, based on the determination that splitting of the point cloud data is not enabled along the direction, G-PCC decoder 300 may determine that a size of the LPUs is equal to a size of the point cloud data along the direction.

The splitting of an LPU into PUs may be determined similar to examples described above with respect to splitting a point cloud into LPUs. For instance, for each dimension (i.e., x, y, and z), an indication whether an LPU is split along the dimension may be signaled. For example, a split_lpu_to_pu_x flag may be signaled for the x dimension; split_lpu_to_pu_x equal to 1 indicates that split may occur along the x dimension; and split_lpu_to_pu_x equal to 0 indicates that split does not occur along the x dimension. Similarly, a split_lpu_to_pu_y flag may be signaled for the y dimension; split_lpu_to_pu_y equal to 1 indicates that split may occur along the y dimension; and split_lpu_to_pu_y equal to 0 indicates that split does not occur along the y dimension. A split_lpu_to_pu_z flag may be signaled for the z dimension; split_lpu_to_pu_z equal to 1 indicates that split may occur along the z dimension; and split_lpu_to_pu_z equal to 0 indicates that split does not occur along the z dimension.

In some examples, for each dimension (i.e., x, y, and z), the minimum PU size along the dimension may be predetermined or signaled. For instance, PU_size_x may be specified to indicate the minimum PU size along the x dimension. PU_size_y may be specified to indicate the minimum PU size along the y dimension. PU_size_z may be specified to indicate the minimum PU size along the z dimension. The terms "direction" and "dimension" are used interchangeably in this disclosure.

In some examples, G-PCC encoder 200 only signals the minimum PU size along a dimension when LPU-to-PU splitting along that dimension is specified or indicated as enabled. For example, only when split_lpu_to_pu_x indicates that LPU-to-PU split along x-dimension may be enabled, PU_size_x may be signaled to indicate the minimum size of the PU along the x dimension. Similar examples may apply with respect to the y and z dimensions. In some examples, for each dimension, the minimum PU size may be specified as a ratio of the LPU size to the minimum PU size. For instance, G-PCC encoder 200 may signal a syntax element having a value equal to LPU_size_x divided by PU_size_x. In some examples, to further reduce the signaling cost, G-PCC encoder 200 may signal a syntax element having a value equal to $\log_2$(LPU_size_x/PU_size_x). This signaled value may be defined as a LPU_to_PU_size_ratio_log 2 syntax element.

In some examples, for each dimension, the value of the minimum PU size along a dimension may be used to indicate (a) whether splitting is enabled along the dimension, and also (b) the minimum size of the PU along the dimension. For example, PU_size_x equal to 0 may specify that LPU-to-PU splitting is not enabled along the x dimension; PU_size_x greater than 0 may specify that LPU-to-PU splitting is enabled along the x dimension, and minimum size of the PU along the x-dimension is PU_size_x. Alternatively, the same may apply to LPU_to_PU_size_ratio_log 2. Similar examples may apply with respect to the y and z dimensions.

When splitting is not enabled along a dimension, G-PCC encoder 200 and G-PCC decoder 300 may infer the value of minimum PU size along the dimension to be equal to the size of the LPU along the dimension. For example, when the size of the LPU is LPU_size_x, LPU_size_y, and LPU_size_z along the x, y, and z dimensions, respectively, and split_lpu_to_pu_x is equal to 0, the minimum value of PU_size_x is inferred to be equal to LPU_size_x. Similar examples may apply with respect to the y and z dimensions.

In some examples, a cloud may be split in the vertical direction. In this example, the LPU size in the x and y directions may be set equal to the sizes of the cloud (or the bounding box of the cloud) in x and y directions, respectively. In some examples, a cloud may be split in the horizontal x direction. In this example, the LPU size in y and z directions may be set equal to the sizes of the cloud (or the bounding box of the cloud) in y and z directions, respectively. In one example, a cloud may be split in the horizontal y direction. In this example, the LPU size in x and z directions may be set equal to the sizes of the cloud (or the bounding box of the cloud) in x and z directions, respectively.

Thus, in such examples, G-PCC encoder 200 may signal a first indication indicating whether the point cloud data is split into the LPUs in an x direction, signal a second signaled indication indicating whether the point cloud data is split into the LPUs in a y direction, and/or signal a third signaled indication indicating whether the point cloud data is split into the LPUs in a z direction. Similarly, G-PCC decoder 300 may determine, based on a first signaled indication, that the point cloud data is split into the LPUs in an x direction. G-PCC decoder 300 may determine, based on a second signaled indication, that the point cloud data is split into the LPUs in a y direction. G-PCC decoder 300 may determine, based on a third signaled indication, that the point cloud data is split into the LPUs in a z direction.

In some examples, the split of a cloud in only one direction for inter prediction may be controlled by a flag which may be signaled in a header level (e.g., a sequence parameter set (SPS) or geometry brick header (GBH) level). For instance, G-PCC encoder 200 may signal a syntax element in a header level indicating that the point cloud data is split into the LPUs in only one of the directions. G-PCC decoder 300 may determine, based on a syntax element signaled in a header level, that point cloud data is split into the LPUs in only one of the directions.

In some examples, the motion of a PU may be set equal to zero. In such examples, an LPU is not split into lower depth and the motion of the PU at LPU level may not be signaled. This setting may be controlled by a flag which may be signaled in a header level (e.g., SPS or gbh level).

In some examples, the motion of a PU may not be signaled when the PU has no reference points. In other words, if there are no points in an area of the reference frame collocated with the PU, no motion information (e.g., motion vector, etc.) is signaled for the PU.

In some examples, the motion of a PU may be signaled using a prediction method. For instance, G-PCC encoder 200 and G-PCC decoder 300 may determine base motion of a PU. G-PCC encoder 200 may signal the difference between the base motion and the actual motion of the PU. For example, G-PCC encoder 200 may signal a motion vector difference (MVD) that indicates a difference between a base motion vector and a motion vector indicating the actual motion of the PU. G-PCC decoder 300 may reconstruct the actual motion vector of the PU based on the base motion vector and the MVD (e.g., by adding corresponding components of the base motion vector and the MVD). In some examples, the base motion may be the translation part of the global motion. In some examples, the rotation matrix of global motion may be applied in motion compensation of a PU.

In some examples, a group of PUs (e.g., PUs at the same depth) may share the same base motion. The base motion may be signaled in the bitstream, or it may be derived using a neighbor PU of the PU group. Thus, in some such examples, G-PCC encoder 200 may signal different MVDs for different PUs in the PU group. For each PU in the PU group, G-PCC decoder 300 may reconstruct the actual motion vectors for the PU based on the MVD for the PU and the base motion vector for the PU group. In some examples, the base motion may be the translation part of the global motion. In some examples, the rotation matrix of global motion may be applied in motion compensation of a PU.

In one example G-PCC codec, the reference points for a PU are derived first. Then, the set of these reference points are used for motion estimation and motion compensation. This disclosure proposes to use the information of reference such as the number of reference points to restrict the use of local prediction. For instance, in one example, an LPU may not be predicted using local prediction if the number of reference points (or the number of points in an active window) is lower than a predefined threshold which may be signaled in header information, e.g., geometry slice header, geometry parameter set, gbh or sequence parameter set (sps) level. In this example, when this condition is satisfied, the LPU may not be split further into sub-PUs, and the LPU may be considered as a vehicle LPU with zero local motion. The LPU mode and split flag and motion may be not signaled in this example.

In some examples, the split of a PU into PUs in a higher depth may be restricted by the number of reference points of the PU. For example, if the number of the reference points is lower than a predefined threshold, the split of the PU may not be allowed. The predefined threshold for PU split restriction may be dependent on the PU size or PU depth.

Figure 8:
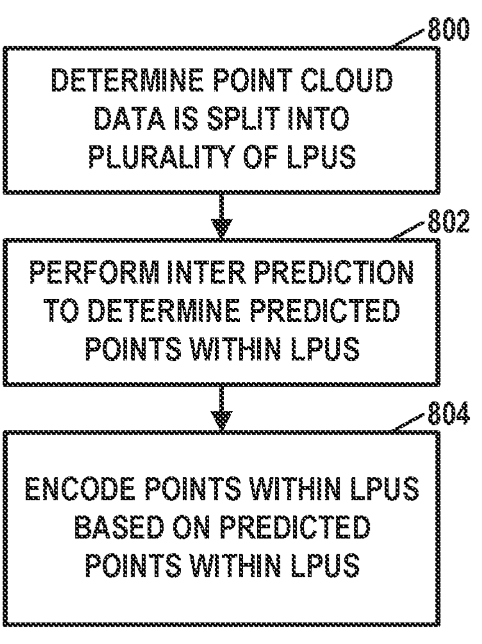
FIG. 8 is a flowchart illustrating an example operation of a G-PCC encoder according to techniques of this disclosure.

FIG. 8 is a flowchart illustrating an example operation of G-PCC encoder 200 according to techniques of this disclosure. In the example of FIG. 8, a geometry encoding unit of G-PCC encoder 200 (e.g., octree analysis unit 210 and/or arithmetic encoding unit 214) may determine that the point cloud data is split into a plurality of LPUs (800). In accordance with one or more techniques of this disclosure, at least two of the LPUs have different sizes along different directions. For example, the LPUs may have a first size in a first direction (e.g., x, y, or z direction) and the LPUs may have a second size different from the first size in a second direction. In some examples, the sizes of LPUs align with a quadtree-binary tree splitting of the point cloud data determined by octree geometry coding. G-PCC encoder 200 may analyze different possible ways of splitting the point cloud data into the plurality of LPUs. G-PCC encoder 200 may select the way of splitting the point cloud based on a rate-distortion metric.

The geometry encoding unit of G-PCC encoder 200 may signal that the point cloud data is split into a plurality of LPUs according to any of the examples provided elsewhere in this disclosure. For instance, for at least one direction of an x, y, and z direction, G-PCC encoder 200 may signal a syntax element indicating whether splitting of the point cloud data is enabled in the direction and a size of the LPUs along the direction.

Additionally, in the example of FIG. 8, the geometry encoding unit of G-PCC encoder 200 may perform inter prediction to determine predicted points for the LPUs (802). For example, G-PCC encoder 200 may perform inter prediction as described above with respect to FIG. 4. For instance, the LPUs may include a first LPU (e.g., a vehicle LPU) and a second LPU (e.g., a world LPU), and G-PCC encoder 200 may determine predicted points within the first LPU based on a previously reconstructed point cloud without application of global motion compensation to the previously reconstructed point cloud. G-PCC encoder 200 may determine predicted points within the second LPU based on the previously reconstructed point cloud with application of global motion compensation to the previously reconstructed point cloud. Furthermore, in some examples, G-PCC encoder 200 may apply location motion estimation and local motion compensation. For instance, G-PCC encoder 200 may determine a motion of an LPU of the plurality of LPUs and use the motion of the LPU to predict points within the LPU. In examples where one or more of the LPUs are further divided into PUs, G-PCC encoder 200 may perform inter prediction to determine predicted points for PUs of the LPUs.

The geometry encoding unit of G-PCC encoder 200 may encode points within the LPUs based on the predicted points for the LPUs (804). For example, G-PCC encoder 200 may signal encoded residual values for points in the LPUs. The residual values for a point may indicate a difference between an actual position of the point and a position of a corresponding predicted point.

Figure 9:
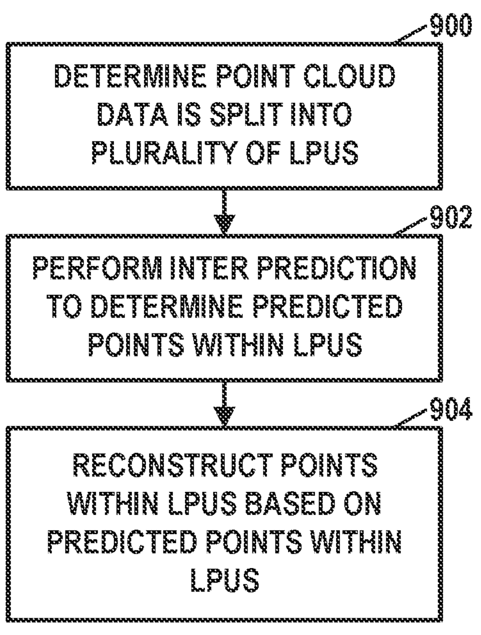
FIG. 9 is a flowchart illustrating an example operation of a G-PCC decoder according to techniques of this disclosure.

FIG. 9 is a flowchart illustrating an example operation of G-PCC decoder 300 according to techniques of this disclosure. In the example of FIG. 9, a geometry decoding unit of G-PCC decoder 300 (e.g., geometry arithmetic decoding unit 302 and octree synthesis unit 306) may determine that the point cloud data is split into a plurality of LPUs (900). In accordance with one or more techniques of this disclosure, at least two of the LPUs have different sizes along different directions. G-PCC decoder 300 may determine that the point cloud data is split into the plurality of LPUs according to any of the examples provided elsewhere in this disclosure. For example, the LPUs may have a first size in a first direction (e.g., x, y, or z direction) and the LPUs may have a second size different from the first size in a second direction. In some examples, the sizes of LPUs align with a quadtree-binary tree splitting of the point cloud data determined by octree geometry coding. In some examples, as part of determining that the point cloud data is split into the LPUs comprises, G-PCC decoder 300 may, for at least one direction of an x, y, and z direction, obtain a syntax element indicating both whether splitting of the point cloud data is enabled in the direction and a size of the LPUs along the direction.

Furthermore, in the example of FIG. 9, the geometry decoding unit of G-PCC decoder 300 may perform inter prediction to determine predicted points for the LPUs (902). For example, G-PCC decoder 300 may perform inter prediction as described above with respect to FIG. 4 and FIG. 5. For instance, the LPUs may include a vehicle LPU and a world LPU, and G-PCC encoder 200 may determine predicted points within the vehicle LPU based on a previously reconstructed point cloud without application of global motion compensation to the previously reconstructed point cloud. G-PCC encoder 200 may determine predicted points within the world LPUs based on the previously reconstructed point cloud with application of global motion compensation to the previously reconstructed point cloud. Furthermore, in some examples, G-PCC encoder 200 may apply location motion estimation and local motion compensation. For instance, G-PCC encoder 200 may determine a motion of an LPU of the plurality of LPUs and use the motion of the LPU to predict points within the LPU.

G-PCC decoder 300 may reconstruct points within the LPUs based on the predicted points for the LPUs (904). For example, G-PCC decoder 300 may obtain encoded residual values for points in the LPUs. G-PCC decoder 300 may reconstruct points in the LPUs using the encoded residual values for the points and the predicted points for the LPUs.

Figure 10:
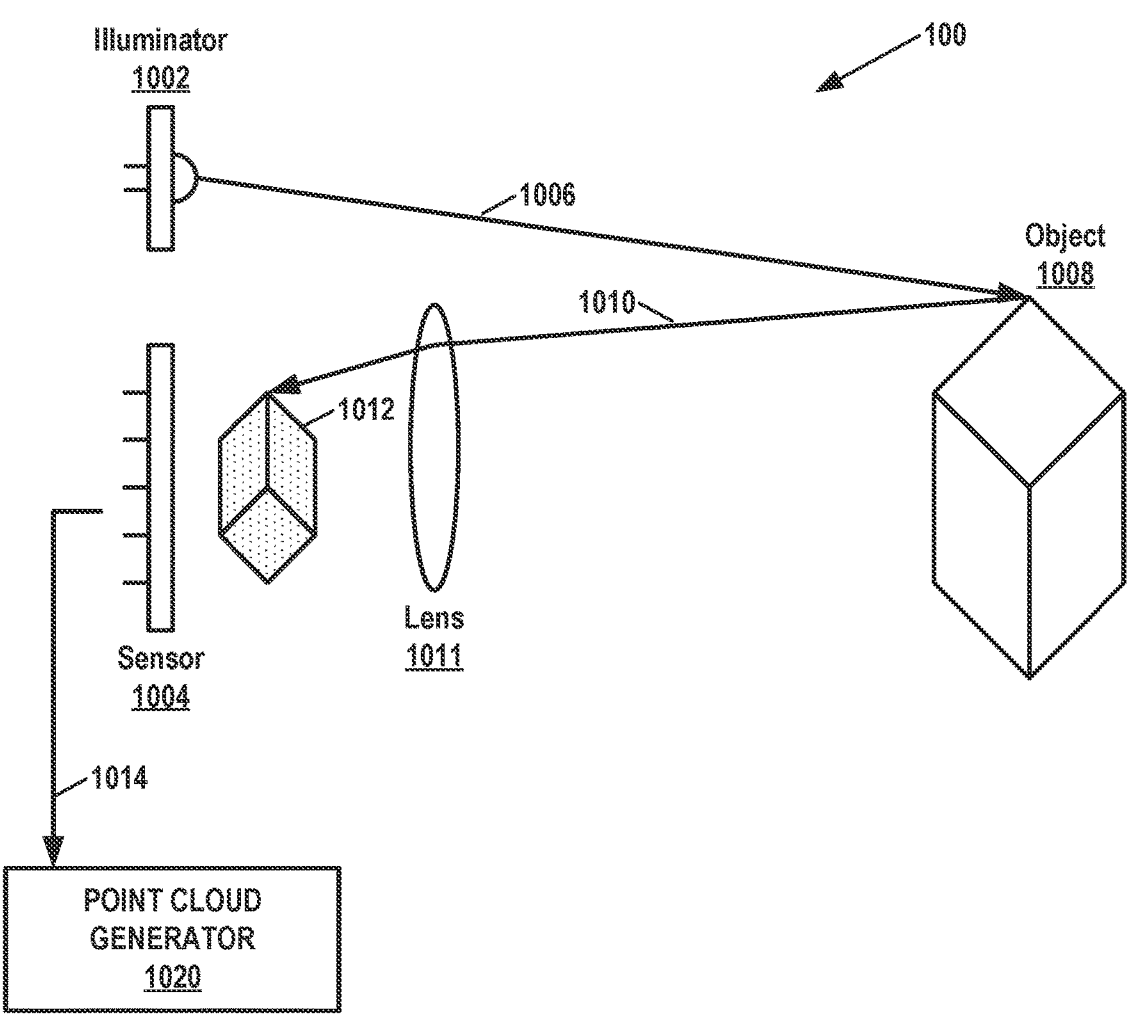
FIG. 10 is a conceptual diagram illustrating an example range-finding system that may be used with one or more techniques of this disclosure.

FIG. 10 is a conceptual diagram illustrating an example range-finding system 1000 that may be used with one or more techniques of this disclosure. In the example of FIG. 10, range-finding system 1000 includes an illuminator 1002 and a sensor 1004. Illuminator 1002 may emit light 1006. In some examples, illuminator 1002 may emit light 1006 as one or more laser beams. Light 1006 may be in one or more wavelengths, such as an infrared wavelength or a visible light wavelength. In other examples, light 1006 is not coherent, laser light. When light 1006 encounters an object, such as object 1008, light 1006 creates returning light 1010. Returning light 1010 may include backscattered and/or reflected light. Returning light 1010 may pass through a lens 1011 that directs returning light 1010 to create an image 1012 of object 1008 on sensor 1004. Sensor 1004 generates signals 1014 based on image 1012. Image 1012 may comprise a set of points (e.g., as represented by dots in image 1012 of FIG. 10).

In some examples, illuminator 1002 and sensor 1004 may be mounted on a spinning structure so that illuminator 1002 and sensor 1004 capture a 360-degree view of an environment. In other examples, range-finding system 1000 may include one or more optical components (e.g., mirrors, collimators, diffraction gratings, etc.) that enable illuminator 1002 and sensor 1004 to detect ranges of objects within a specific range (e.g., up to 360-degrees). Although the example of FIG. 10 only shows a single illuminator 1002 and sensor 1004, range-finding system 1000 may include multiple sets of illuminators and sensors.

In some examples, illuminator 1002 generates a structured light pattern. In such examples, range-finding system 1000 may include multiple sensors 1004 upon which respective images of the structured light pattern are formed. Range-finding system 1000 may use disparities between the images of the structured light pattern to determine a distance to an object 1008 from which the structured light pattern backscatters. Structured light-based range-finding systems may have a high level of accuracy (e.g., accuracy in the sub-millimeter range), when object 1008 is relatively close to sensor 1004 (e.g., 0.2 meters to 2 meters). This high level of accuracy may be useful in facial recognition applications, such as unlocking mobile devices (e.g., mobile phones, tablet computers, etc.) and for security applications.

In some examples, range-finding system 1000 is a time of flight (ToF)-based system. In some examples where range-finding system 1000 is a ToF-based system, illuminator 1002 generates pulses of light. In other words, illuminator 1002 may modulate the amplitude of emitted light 1006. In such examples, sensor 1004 detects returning light 1010 from the pulses of light 1006 generated by illuminator 1002. Range-finding system 1000 may then determine a distance to object 1008 from which light 1006 backscatters based on a delay between when light 1006 was emitted and detected and the known speed of light in air. In some examples, rather than (or in addition to) modulating the amplitude of the emitted light 1006, illuminator 1002 may modulate the phase of the emitted light 1006. In such examples, sensor 1004 may detect the phase of returning light 1010 from object 1008 and determine distances to points on object 1008 using the speed of light and based on time differences between when illuminator 1002 generated light 1006 at a specific phase and when sensor 1004 detected returning light 1010 at the specific phase.

In other examples, point cloud data may be generated without using illuminator 1002. For instance, in some examples, sensors 1004 of range-finding system 1000 may include two or more optical cameras. In such examples, range-finding system 1000 may use the optical cameras to capture stereo images of the environment, including object 1008. Range-finding system 1000 may include a point cloud generator 1020 that may calculate the disparities between locations in the stereo images. Range-finding system 1000 may then use the disparities to determine distances to the locations shown in the stereo images. From these distances, point cloud generator 1020 may generate point cloud data.

Sensors 1004 may also detect other attributes of object 1008, such as color and reflectance information. In the example of FIG. 10, a point cloud generator 1020 may generate point cloud data based on signals 1014 generated by sensor 1004. Range-finding system 1000 and/or point cloud generator 1020 may form part of data source 104 (FIG. 1). Hence, point cloud data generated by range-finding system 1000 may be encoded and/or decoded according to any of the techniques of this disclosure.

Figure 11:
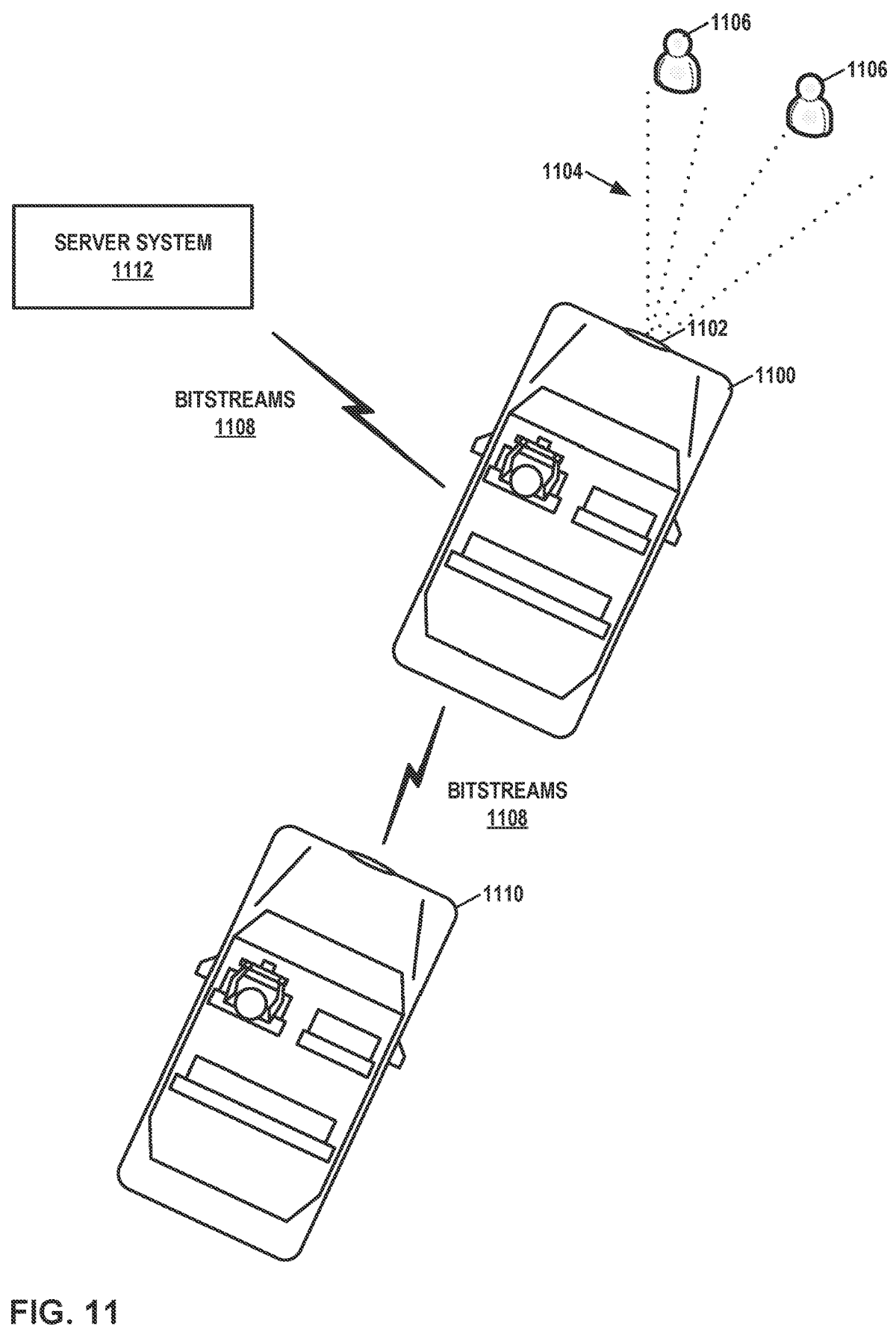

FIG. 11 is a conceptual diagram illustrating an example vehicle-based scenario in which one or more techniques of this disclosure may be used. In the example of FIG. 11, a vehicle 1100 includes a range-finding system 1102. Range-finding system 1102 may be implemented in the manner discussed with respect to FIG. 10. Although not shown in the example of FIG. 11, vehicle 1100 may also include a data source, such as data source 104 (FIG. 1), and a G-PCC encoder, such as G-PCC encoder 200 (FIG. 1). In the example of FIG. 11, range-finding system 1102 emits laser beams 1104 that reflect off pedestrians 1106 or other objects in a roadway. The data source of vehicle 1100 may generate point cloud data based on signals generated by range-finding system 1102. The G-PCC encoder of vehicle 1100 may encode the point cloud data to generate bitstreams 1108, such as geometry bitstream 203 (FIG. 2) and attribute bitstream 205 (FIG. 2). Bitstreams 1108 may include many fewer bits than the unencoded point cloud data obtained by the G-PCC encoder.

An output interface of vehicle 1100 (e.g., output interface 108 (FIG. 1)) may transmit bitstreams 1108 to one or more other devices. Bitstreams 1108 may include many fewer bits than the unencoded point cloud data obtained by the G-PCC encoder. Thus, vehicle 1100 may be able to transmit bitstreams 1108 to other devices more quickly than the unencoded point cloud data. Additionally, bitstreams 1108 may require less data storage capacity. As described elsewhere in this disclosure, techniques of this disclosure may further reduce the size of encoded data.

In the example of FIG. 11, vehicle 1100 may transmit bitstreams 1108 to another vehicle 1110. Vehicle 1110 may include a G-PCC decoder, such as G-PCC decoder 300 (FIG. 1). The G-PCC decoder of vehicle 1110 may decode bitstreams 1108 to reconstruct the point cloud data. Reconstructing the point cloud data may include determining coordinates of points of the point cloud data and/or determining attribute values for points of the point cloud data. Vehicle 1110 may use the reconstructed point cloud data for various purposes. For instance, vehicle 1110 may determine based on the reconstructed point cloud data that pedestrians 1106 are in the roadway ahead of vehicle 1100 and therefore start slowing down, e.g., even before a driver of vehicle 1110 realizes that pedestrians 1106 are in the roadway. Thus, in some examples, vehicle 1110 may perform an autonomous navigation operation based on the reconstructed point cloud data.

Additionally or alternatively, vehicle 1100 may transmit bitstreams 1108 to a server system 1112. Server system 1112 may use bitstreams 1108 for various purposes. For example, server system 1112 may store bitstreams 1108 for subsequent reconstruction of the point cloud data. In this example, server system 1112 may use the point cloud data along with other data (e.g., vehicle telemetry data generated by vehicle 1100) to train an autonomous driving system. In other example, server system 1112 may store bitstreams 1108 for subsequent reconstruction for forensic crash investigations (e.g., if vehicle 1100 collides with pedestrians 1106).

The techniques of this disclosure may increase coding efficiency, which may decrease the size of bitstreams 1108 or allow more detailed data to be sent in bitstreams 1108 without increasing the sizes of bitstreams 1108.

Figure 12:
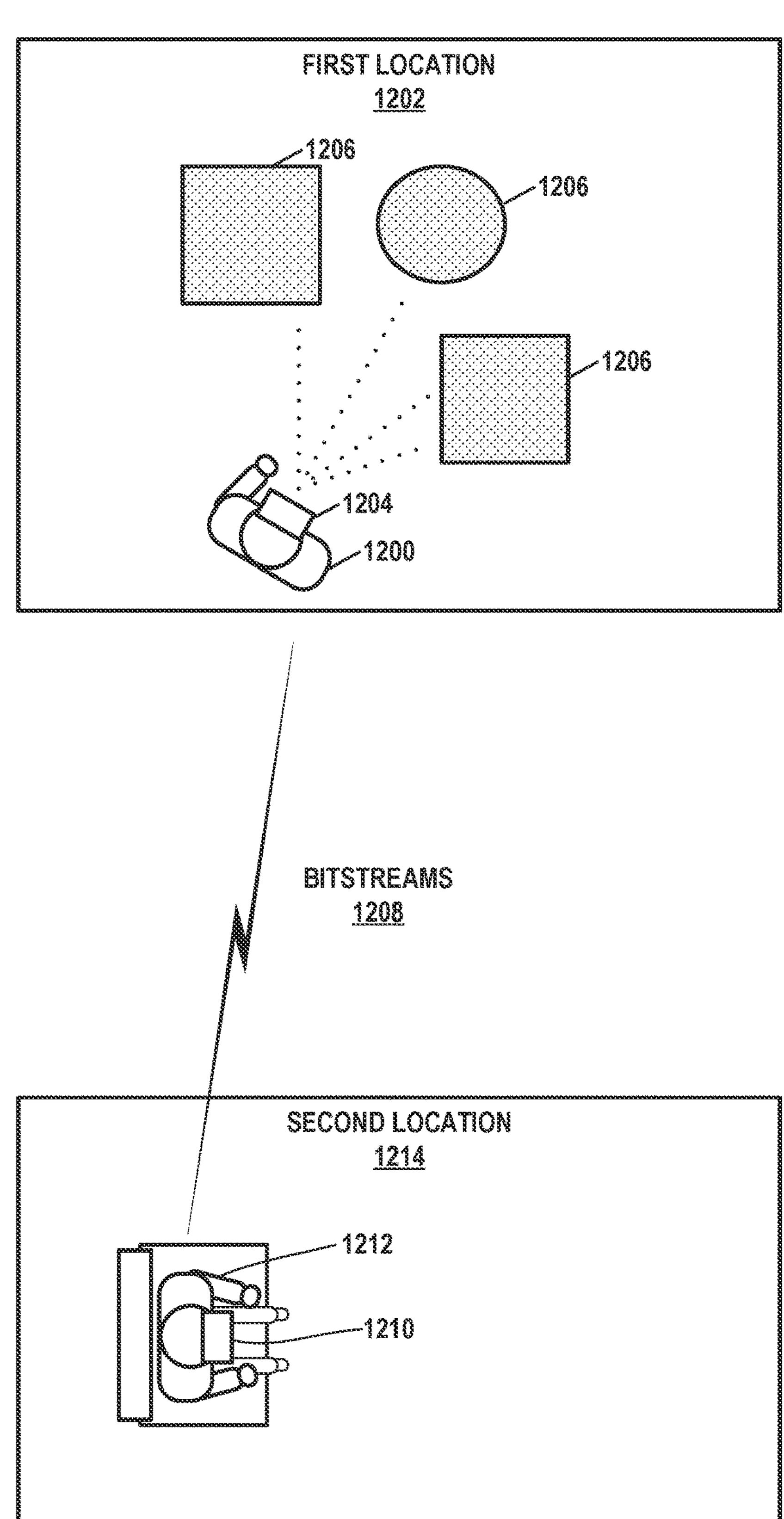
FIG. 12 is a conceptual diagram illustrating an example extended reality system in which one or more techniques of this disclosure may be used.

FIG. 12 is a conceptual diagram illustrating an example extended reality system in which one or more techniques of this disclosure may be used. Extended reality (XR) is a term used to cover a range of technologies that includes augmented reality (AR), mixed reality (MR), and virtual reality (VR). In the example of FIG. 12, a user 1200 is located in a first location 1202. User 1200 wears an XR headset 1204. As an alternative to XR headset 1204, user 1200 may use a mobile device (e.g., mobile phone, tablet computer, etc.). XR headset 1204 includes a depth detection sensor, such as a range-finding system, that detects positions of points on objects 1206 at location 1202. A data source of XR headset 1204 may use the signals generated by the depth detection sensor to generate point cloud data representing objects 1206 at location 1202. XR headset 1204 may include a G-PCC encoder (e.g., G-PCC encoder 200 of FIG. 1) that is configured to encode the point cloud data to generate bitstreams 1208.

XR headset 1204 may transmit bitstreams 1208 (e.g., via a network such as the Internet) to an XR headset 1210 worn by a user 1212 at a second location 1214. XR headset 1210 may decode bitstreams 1208 to reconstruct the point cloud data. XR headset 1210 may use the point cloud data to generate an XR visualization (e.g., an AR, MR, VR visualization) representing objects 1206 at location 1202. Thus, in some examples, such as when XR headset 1210 generates an VR visualization, user 1212 may have a 3D immersive experience of location 1202. In some examples, XR headset 1210 may determine a position of a virtual object based on the reconstructed point cloud data. For instance, XR headset 1210 may determine, based on the reconstructed point cloud data, that an environment (e.g., location 1202) includes a flat surface and then determine that a virtual object (e.g., a cartoon character) is to be positioned on the flat surface. XR headset 1210 may generate an XR visualization in which the virtual object is at the determined position. For instance, XR headset 1210 may show the cartoon character sitting on the flat surface. The techniques of this disclosure may increase coding efficiency, which may decrease the size of bitstreams 1208 or allowing more detailed data to be sent in bitstreams 1208 without increasing the sizes of bitstreams 1208.

Figure 13:
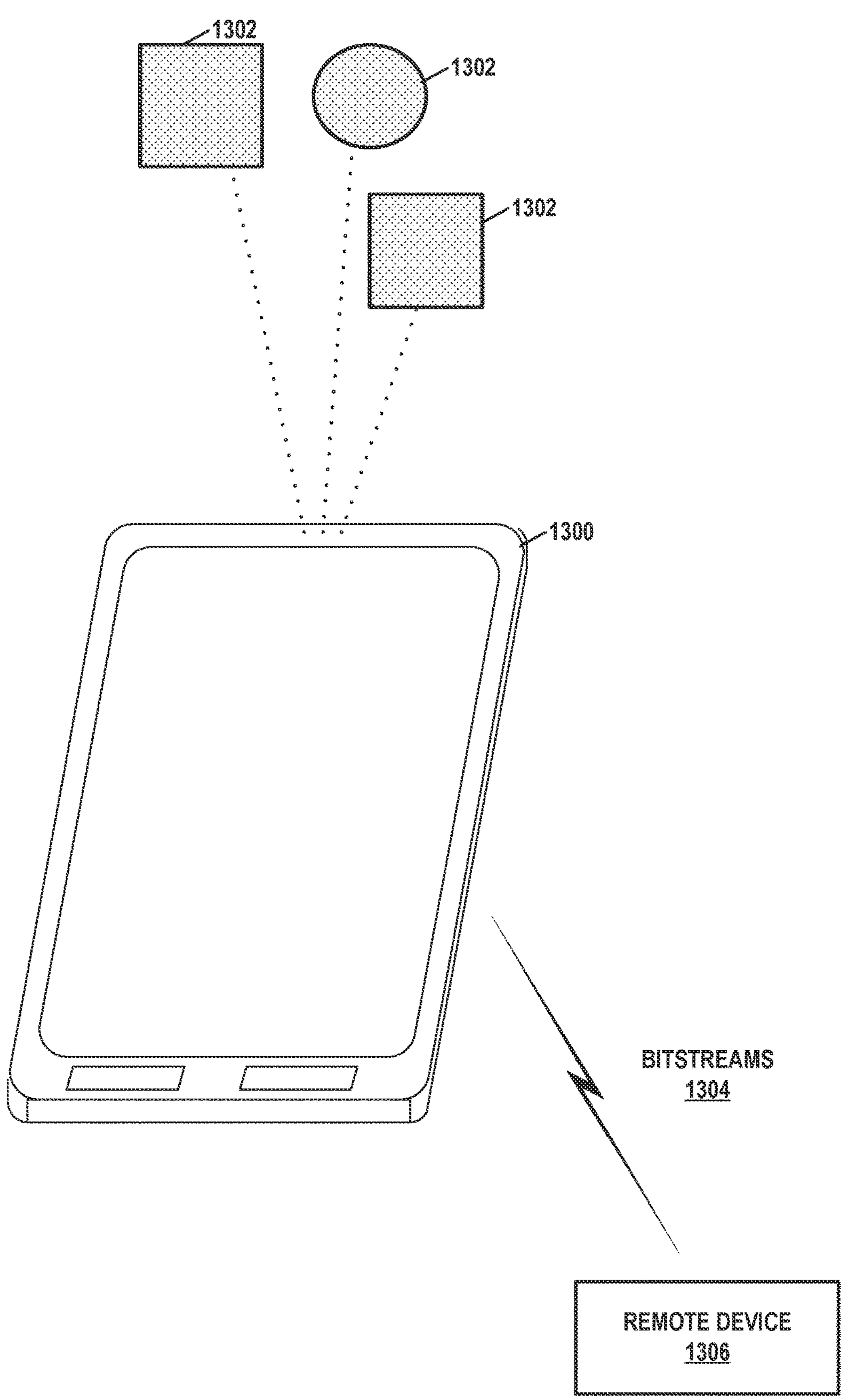
FIG. 13 is a conceptual diagram illustrating an example mobile device system in which one or more techniques of this disclosure may be used.

FIG. 13 is a conceptual diagram illustrating an example mobile device system in which one or more techniques of this disclosure may be used. In the example of FIG. 13, a mobile device 1300, such as a mobile phone or tablet computer, includes a range-finding system, such as a LIDAR system, that detects positions of points on objects 1302 in an environment of mobile device 1300. A data source of mobile device 1300 may use the signals generated by the depth detection sensor to generate point cloud data representing objects 1302. Mobile device 1300 may include a G-PCC encoder (e.g., G-PCC encoder 200 of FIG. 1) that is configured to encode the point cloud data to generate bitstreams 1304. In the example of FIG. 13, mobile device 1300 may transmit bitstreams to a remote device 1306, such as a server system or other mobile device. Remote device 1306 may decode bitstreams 1304 to reconstruct the point cloud data. Remote device 1306 may use the point cloud data for various purposes. For example, remote device 1306 may use the point cloud data to generate a map of environment of mobile device 1300. For instance, remote device 1306 may generate a map of an interior of a building based on the reconstructed point cloud data. In another example, remote device 1306 may generate imagery (e.g., computer graphics) based on the point cloud data. For instance, remote device 1306 may use points of the point cloud data as vertices of polygons and use color attributes of the points as the basis for shading the polygons. In some examples, remote device 1306 may use the reconstructed point cloud data for facial recognition or other security applications. The techniques of this disclosure may increase coding efficiency, thereby reducing the sizes of bitstreams 1304 or allowing more detailed data to be sent in bitstreams 1304 without increasing the sizes of bitstreams 1304.

Examples in the various aspects of this disclosure may be used individually or in any combination.

The following is a non-limiting list of examples in accordance with one or more techniques of this disclosure.

Example 1A. A method of decoding point cloud data, the method comprising: determining that the point cloud data is split into a plurality of largest prediction units (LPUs), wherein at least two of the LPUs have different sizes along different directions; determining a motion vector of a prediction unit (PU) of an LPU of the plurality of LPUs; using the motion vector of the PU to predict points within the PU; and reconstructing the points within the PU based on the predicted points within the PU.

Example 2A. A method of encoding point cloud data, the method comprising: splitting the point cloud data into a plurality of largest prediction units (LPUs), wherein at least two of the LPUs have different sizes along different directions; determining a motion vector of a prediction unit (PU) of an LPU of the plurality of LPUs; using the motion vector of the PU to predict points within the PU; and encoding the points within the PU based on the predicted points within the PU.

Example 3A. A method of decoding point cloud data, the method comprising: determining a splitting of the point cloud data into a plurality of largest prediction units (LPUs); determining a motion of a prediction unit (PU) of an LPU of the plurality of LPUs; using the motion of the PU to predict points within the PU; and reconstructing the points within the PU based on the predicted points within the PU.

Example 4A. The method of example 3A, wherein determining the splitting of the point cloud data comprises one or more of: determining, based on a first signaled indication, whether the point cloud data is split into the LPUs in an x dimension; determining, based on a second signaled indication, whether the point cloud data is split into the LPUs in a y dimension, or determining, based on a third signaled indication, whether the point cloud data is split into the LPUs in a z dimension.

Example 5A. The method of any of examples 3A or 4A, wherein determining the splitting of the point cloud data comprises, for each dimension of a plurality of dimensions, determining a size of the LPU along the dimension.

Example 6A. The method of any of examples 3A-5A, wherein: the method further comprises, for each dimension of a plurality of dimensions, determining a minimum PU size for the dimension; and determining the splitting of the point cloud data comprises determining the splitting of the point cloud data based in part on the minimum PU sizes for the dimensions.

Example 7A. The method of example 6A, wherein determining the splitting of the point cloud data comprises for each dimension of the plurality of dimensions comprises, determining, based on the minimum PU size for the dimension, whether splitting is enabled along the dimension.

Example 8A. The method of example 7A, wherein determining the splitting of the point cloud data comprises, for at least one dimension of the plurality of dimensions, inferring a minimum PU size along the dimension to be equal to a size of the LPU along the dimension based on a split not being enabled for the dimension.

Example 9A. The method of any of examples 3A-8A, wherein determining the motion of the PU comprises determining that the motion of the PU is set equal to 0.

Example 10A. The method of any of examples 3A-9A, wherein the motion of the PU is not signaled when the PU has no reference points.

Example 11A. The method of any of examples 3A-10A, wherein a group of PUs includes the PU and the group of PUs shares the same base motion.

Example 12A. The method of example 11A, wherein a base motion is a translation part of global motion.

Example 13A. The method of any of examples 3A-12A, wherein determining the motion of the PU comprises applying a rotation matrix of global motion in motion compensation of the PU.

Example 14A. The method of any of examples 3A-13A, further comprising: based on a number of reference points being lower than a predefined threshold, refraining from predicting the LPU using local prediction.

Example 15A. The method of any of examples 3A-13A, wherein determining the splitting of the point cloud data comprises splitting a given PU into PUs in a higher depth subject to a restriction based on a number of reference points of the given PU.

Example 16A. A method of encoding point cloud data, the method comprising: splitting the point cloud data into a plurality of largest prediction units (LPUs); determining a motion of a prediction unit (PU) of an LPU of the plurality of LPUs; using the motion of the PU to predict points within the PU; and encoding the points within the PU based on the predicted points within the PU.

Example 17A. The method of example 16A, further comprising one or more of: signaling a first indication that indicates whether the point cloud data is split into the LPUs in an x dimension; signaling a second indication that indicates whether the point cloud data is split into the LPUs in a y dimension, or signaling a third indicating that indicates whether the point cloud data is split into the LPUs in a z dimension.

Example 18A. The method of any of examples 16A or 17A, wherein splitting the point cloud data comprises, for each dimension of a plurality of dimensions, determining a size of the LPU along the dimension.

Example 19A. The method of any of examples 16A-18A, wherein: the method further comprises, for each dimension of a plurality of dimensions, determining a minimum PU size for the dimension; and splitting the point cloud data comprises splitting the point cloud data based in part on the minimum PU sizes for the dimensions.

Example 20A. The method of examples 19A, wherein determining the splitting of the point cloud data comprises for each dimension of the plurality of dimensions, determining, based on the minimum PU size for the dimension, whether splitting is enabled along the dimension.

Example 21A. The method of example 20A, wherein splitting the point cloud data comprises, for at least one dimension of the plurality of dimensions, inferring a minimum PU size along the dimension to be equal to a size of the LPU along the dimension based on a split not being enabled for the dimension.

Example 22A. The method of any of examples 16A-21A, wherein determining the motion of the PU comprises determining that the motion of the PU is set equal to 0.

Example 23A. The method of any of examples 16A-22A, further comprising refraining from signaling the motion of the PU based on the PU not having reference points.

Example 24A. The method of any of examples 16A-23A, wherein a group of PUs includes the PU and the group of PUs shares the same base motion.

Example 25A. The method of example 24A, wherein a base motion is a translation part of global motion.

Example 26A. The method of any of examples 16A-25A, wherein determining the motion of the PU comprises applying a rotation matrix of global motion in motion compensation of the PU.

Example 27A. The method of any of examples 16A-26A, further comprising: based on a number of reference points being lower than a predefined threshold, refraining from predicting the LPU using local prediction.

Example 28A. The method of any of examples 16A-27A, wherein splitting the point cloud data comprises splitting a given PU into PUs in a higher depth subject to a restriction based on a number of reference points of the given PU.

Example 29A. A device for processing a point cloud, the device comprising one or more means for performing the method of any of examples 1A-28A.

Example 30A. The device of example 29A, wherein the one or more means comprise one or more processors implemented in circuitry.

Example 31A. The device of any of examples 29A or 30A, further comprising a memory to store the data representing the point cloud data.

Example 32A. The device of any of examples 29A-31A, wherein the device comprises a decoder.

Example 33A. The device of any of examples 29A-32A, wherein the device comprises an encoder.

Example 34A. The device of any of examples 29A-33A, further comprising a device to generate the point cloud data.

Example 35A. The device of any of examples 29A-34A, further comprising a display to present imagery based on the point cloud data.

Example 36A. A computer-readable storage medium having stored thereon instructions that, when executed, cause one or more processors to perform the method of any of examples 1A-28A.

Example 1B: A method of decoding point cloud data includes determining that the point cloud data is split into a plurality of largest prediction units (LPUs), wherein at least two of the LPUs have different sizes along different directions; performing inter prediction to determine predicted points for the LPUs; and reconstructing points within the LPUs based on the predicted points for the LPUs.

Example 2B: The method of example 1B, wherein the sizes of LPUs align with a quadtree-binary tree splitting of the point cloud data determined by octree geometry coding.

Example 3B: The method of any of examples 1B and 2B, wherein: the LPUs include a first LPU and a second LPU, and performing inter prediction to determine the predicted points within the LPUs comprises: determining predicted points within the first LPU based on a previously reconstructed point cloud without application of global motion compensation to the previously reconstructed point cloud; and determining predicted points within the second LPU based on the previously reconstructed point cloud with application of global motion compensation to the previously reconstructed point cloud.

Example 4B: The method of any of examples 1B through 3B, wherein performing inter prediction to determine predicted points within the LPUs comprises: determining a motion of an LPU of the plurality of LPUs; and using the motion of the LPU to predict points within the LPU.

Example 5B: The method of any of examples 1B through 4B, wherein determining that the point cloud data is split into a plurality of LPUs comprises: determining, based on a first signaled indication, that the point cloud data is split into the LPUs in an x direction; determining, based on a second signaled indication, that the point cloud data is split into the LPUs in a y direction, or determining, based on a third signaled indication, that the point cloud data is split into the LPUs in a z direction.

Example 6B: The method of any of examples 1B through 4B, wherein determining that the point cloud data is split into the LPUs comprises, for at least one direction of an x, y, and z direction, obtaining a syntax element indicating whether splitting of the point cloud data is enabled in the direction and a size of the LPUs along the direction.

Example 7B: The method of any of examples 1B through 4B, wherein determining that the point cloud data is split into the LPUs comprises: determining that splitting of the point cloud data is not enabled along at least one direction of an x, y, or z direction, and based on the determination that splitting of the point cloud data is not enabled along the direction, determining that a size of the LPUs is equal to a size of the point cloud data along the direction.

Example 8B: The method of any of examples 1B through 7B, wherein: the directions include an x, y, and z direction, and one of: the point cloud data is split in a vertical direction, and the sizes of the LPUs in x and y directions are equal to sizes of the point cloud data in the x and y directions, the point cloud data is split in a horizontal x direction, and the sizes of the LPUs in y and z directions are equal to sizes of the point cloud data in the x and y directions, or the point cloud data is split in a horizontal y direction, and the sizes of the LPUs in x and z directions are equal to sizes of the point cloud data in the x and y directions.

Example 9B: The method of any of examples 1B through 8B, wherein determining that the point cloud data is split into the plurality of LPUs comprises determining, based on a syntax element signaled in a header level, that the point cloud data is split into the LPUs in only one of the directions.

Example 10B: A method of encoding point cloud data includes determining that the point cloud data is split into a plurality of largest prediction units (LPUs), wherein at least two of the LPUs have different sizes along different directions; performing inter prediction to determine predicted points for the LPUs; and encoding points within the LPUs based on the predicted points for the LPUs.

Example 11B: The method of example 10B, wherein the sizes of LPUs align with a quadtree-binary tree splitting of the point cloud data determined by octree geometry coding.

Example 12B: The method of any of examples 10B and 11B, wherein: the LPUs include a first LPU and a second LPU, and performing inter prediction to determine the predicted points within the LPUs comprises: determining predicted points within the first LPU based on a previously reconstructed point cloud without application of global motion compensation to the previously reconstructed point cloud; and determining predicted points within the second LPU based on the previously reconstructed point cloud with application of global motion compensation to the previously reconstructed point cloud.

Example 13B: The method of any of examples 10B through 12B, wherein performing inter prediction to determine predicted points within the LPUs comprises: determining a motion of an LPU of the plurality of LPUs; and using the motion of the LPU to predict points within the LPU.

Example 14B: The method of any of examples 10B through 13B, further includes signaling a first indication indicating whether the point cloud data is split into the LPUs in an x direction; signaling a second signaled indication indicating whether the point cloud data is split into the LPUs in a y direction, or signaling a third signaled indication indicating whether the point cloud data is split into the LPUs in a z direction.

Example 15B: The method of any of examples 10B through 13B, further comprising, for at least one direction of an x, y, and z direction, signaling a syntax element indicating whether splitting of the point cloud data is enabled in the direction and a size of the LPUs along the direction.

Example 16B: The method of any of examples 10B through 15B, wherein: the directions include an x, y, and z direction, and one of: the point cloud data is split in a vertical direction, and the sizes of the LPUs in x and y directions are equal to sizes of the point cloud data in the x and y directions, the point cloud data is split in a horizontal X direction, and the sizes of the LPUs in y and z directions are equal to sizes of the point cloud data in the x and y directions, or the point cloud data is split in a horizontal Y direction, and the sizes of the LPUs in x and z directions are equal to sizes of the point cloud data in the x and y directions.

Example 17B: The method of any of examples 10B through 16B, further comprising signaling a syntax element in a header level indicating that the point cloud data is split into the LPUs in only one of the directions.

Example 18B: A device for decoding point cloud data includes a memory configured to store the point cloud data; and one or more processors implemented in circuitry, the one or more processors configured to: determine that the point cloud data is split into a plurality of largest prediction units (LPUs), wherein at least two of the LPUs have different sizes along different directions; perform inter prediction to determine predicted points for the LPUs; and reconstruct points within the LPUs based on the predicted points for the LPUs.

Example 19B: The device of example 18B, wherein the one or more processors are configured to, as part of determining that the point cloud data is split into a plurality of LPUs: determine, based on a first signaled indication, that the point cloud data is split into the LPUs in an x direction; determine, based on a second signaled indication, that the point cloud data is split into the LPUs in a y direction, or determine, based on a third signaled indication, that the point cloud data is split into the LPUs in a z direction.

Example 20B: The device of example 18B, wherein the one or more processors are configured to, as part of determining that the point cloud data is split into the LPUs, for each direction of an x, y, and z direction, obtain a syntax element indicating whether splitting of the point cloud data is enabled in the direction and a size of the LPUs along the direction.

Example 21B: The device of example 18B, wherein the one or more processors are configured to, as part of determining that the point cloud data is split into the LPUs, determine that splitting of the point cloud data is not enabled along at least one direction of a x, y, or z direction, and determine that a size of the LPUs is equal to a size of the point cloud data along the direction.

Example 22B: The device of any of examples 18B through 21B, wherein: the directions include an x, y, and z direction, and one of: the point cloud data is split in a vertical direction, and the sizes of the LPUs in x and y directions are equal to sizes of the point cloud data in the x and y directions, the point cloud data is split in a horizontal X direction, and the sizes of the LPUs in y and z directions are equal to sizes of the point cloud data in the x and y directions, or the point cloud data is split in a horizontal Y direction, and the sizes of the LPUs in x and z directions are equal to sizes of the point cloud data in the x and y directions.

Example 23B: The device of any of examples 18B through 22B, further comprising a display to present imagery based on the point cloud data.

Example 24B: A device for encoding point cloud data includes a memory configured to store the point cloud data; and one or more processors implemented in circuitry, the one or more processors configured to: determine that the point cloud data is split into a plurality of largest prediction units (LPUs), wherein at least two of the LPUs have different sizes along different directions; perform inter prediction to determine predicted points for the LPUs; and encode points within the LPUs based on the predicted points for the LPUs.

Example 25B: The device of example 24B, wherein the one or more processors are configured to, as part of determining that the point cloud data is split into a plurality of LPUs: signal a first indication indicating whether the point cloud data is split into the LPUs in an x direction; signal a second signaled indication indicating whether the point cloud data is split into the LPUs in a y direction, or signal a third signaled indication indicating whether the point cloud data is split into the LPUs in a z direction.

Example 26B: The device of example 24B, wherein the one or more processors are configured to, for at least one direction of an x, y, or z direction, signal a syntax element indicating whether splitting of the point cloud data is enabled in the direction and a size of the LPUs along the direction.

Example 27B: The device of any of examples 24B through 26B, wherein: the directions include an x, y, and z direction, and one of: the point cloud data is split in a vertical direction, and the sizes of the LPUs in x and y directions are equal to sizes of the point cloud data in the x and y directions, the point cloud data is split in a horizontal X direction, and the sizes of the LPUs in y and z directions are equal to sizes of the point cloud data in the x and y directions, or the point cloud data is split in a horizontal Y direction, and the sizes of the LPUs in x and z directions are equal to sizes of the point cloud data in the x and y directions.

Example 28B: The device of any of examples 24B through 27B, further comprising a device to generate the point cloud data.

Example 1C: A method of decoding point cloud data includes determining that the point cloud data is split into a plurality of largest prediction units (LPUs), wherein at least two of the LPUs have different sizes along different directions; performing inter prediction to determine predicted points for the LPUs; and reconstructing points within the LPUs based on the predicted points for the LPUs.

Example 2C: The method of example 1C, wherein the sizes of LPUs align with a quadtree-binary tree splitting of the point cloud data determined by octree geometry coding.

Example 3C: The method of example 1C, wherein: the LPUs include a first LPU and a second LPU, and performing inter prediction to determine the predicted points within the LPUs comprises: determining predicted points within the first LPU based on a previously reconstructed point cloud without application of global motion compensation to the previously reconstructed point cloud; and determining predicted points within the second LPU based on the previously reconstructed point cloud with application of global motion compensation to the previously reconstructed point cloud.

Example 4C: The method of example 1C, wherein performing inter prediction to determine predicted points within the LPUs comprises: determining a motion of an LPU of the plurality of LPUs; and using the motion of the LPU to predict points within the LPU.

Example 5C: The method of example 1C, wherein determining that the point cloud data is split into a plurality of LPUs comprises: determining, based on a first signaled indication, that the point cloud data is split into the LPUs in an x direction; determining, based on a second signaled indication, that the point cloud data is split into the LPUs in a y direction, or determining, based on a third signaled indication, that the point cloud data is split into the LPUs in a z direction.

Example 6C: The method of example 1C, wherein determining that the point cloud data is split into the LPUs comprises, for at least one direction of an x, y, and z direction, obtaining a syntax element indicating whether splitting of the point cloud data is enabled in the direction and a size of the LPUs along the direction.

Example 7C: The method of example 1C, wherein determining that the point cloud data is split into the LPUs comprises: determining that splitting of the point cloud data is not enabled along at least one direction of an x, y, or z direction, and based on the determination that splitting of the point cloud data is not enabled along the direction, determining that a size of the LPUs is equal to a size of the point cloud data along the direction.

Example 8C: The method of example 1C, wherein: the directions include an x, y, and z direction, and one of: the point cloud data is split in a vertical direction, and the sizes of the LPUs in x and y directions are equal to sizes of the point cloud data in the x and y directions, the point cloud data is split in a horizontal x direction, and the sizes of the LPUs in y and z directions are equal to sizes of the point cloud data in the x and y directions, or the point cloud data is split in a horizontal y direction, and the sizes of the LPUs in x and z directions are equal to sizes of the point cloud data in the x and y directions.

Example 9C: The method of example 1C, wherein determining that the point cloud data is split into the plurality of LPUs comprises determining, based on a syntax element signaled in a header level, that the point cloud data is split into the LPUs in only one of the directions.

Example 10C: A method of encoding point cloud data includes determining that the point cloud data is split into a plurality of largest prediction units (LPUs), wherein at least two of the LPUs have different sizes along different directions; performing inter prediction to determine predicted points for the LPUs; and encoding points within the LPUs based on the predicted points for the LPUs.

Example 11C: The method of example 10C, wherein the sizes of LPUs align with a quadtree-binary tree splitting of the point cloud data determined by octree geometry coding.

Example 12C: The method of example 10C, wherein: the LPUs include a first LPU and a second LPU, and performing inter prediction to determine the predicted points within the LPUs comprises: determining predicted points within the first LPU based on a previously reconstructed point cloud without application of global motion compensation to the previously reconstructed point cloud; and determining predicted points within the second LPU based on the previously reconstructed point cloud with application of global motion compensation to the previously reconstructed point cloud.

Example 13C: The method of example 10C, wherein performing inter prediction to determine predicted points within the LPUs comprises: determining a motion of an LPU of the plurality of LPUs; and using the motion of the LPU to predict points within the LPU.

Example 14C: The method of example 10C, further includes signaling a first indication indicating whether the point cloud data is split into the LPUs in an x direction; signaling a second signaled indication indicating whether the point cloud data is split into the LPUs in a y direction, or signaling a third signaled indication indicating whether the point cloud data is split into the LPUs in a z direction.

Example 15C: The method of example 10C, further comprising, for at least one direction of an x, y, and z direction, signaling a syntax element indicating whether splitting of the point cloud data is enabled in the direction and a size of the LPUs along the direction.

Example 16C: The method of example 10C, wherein: the directions include an x, y, and z direction, and one of: the point cloud data is split in a vertical direction, and the sizes of the LPUs in x and y directions are equal to sizes of the point cloud data in the x and y directions, the point cloud data is split in a horizontal X direction, and the sizes of the LPUs in y and z directions are equal to sizes of the point cloud data in the x and y directions, or the point cloud data is split in a horizontal Y direction, and the sizes of the LPUs in x and z directions are equal to sizes of the point cloud data in the x and y directions.

Example 17C: The method of example 10C, further comprising signaling a syntax element in a header level indicating that the point cloud data is split into the LPUs in only one of the directions.

Example 18C: A device for decoding point cloud data includes a memory configured to store the point cloud data; and one or more processors implemented in circuitry, the one or more processors configured to: determine that the point cloud data is split into a plurality of largest prediction units (LPUs), wherein at least two of the LPUs have different sizes along different directions; perform inter prediction to determine predicted points for the LPUs; and reconstruct points within the LPUs based on the predicted points for the LPUs.

Example 19C: The device of example 18C, wherein the one or more processors are configured to, as part of determining that the point cloud data is split into a plurality of LPUs: determine, based on a first signaled indication, that the point cloud data is split into the LPUs in an x direction; determine, based on a second signaled indication, that the point cloud data is split into the LPUs in a y direction, or determine, based on a third signaled indication, that the point cloud data is split into the LPUs in a z direction.

Example 20C: The device of example 18C, wherein the one or more processors are configured to, as part of determining that the point cloud data is split into the LPUs, for each direction of an x, y, and z direction, obtain a syntax element indicating whether splitting of the point cloud data is enabled in the direction and a size of the LPUs along the direction.

Example 21C: The device of example 18C, wherein the one or more processors are configured to, as part of determining that the point cloud data is split into the LPUs, determine that splitting of the point cloud data is not enabled along at least one direction of a x, y, or z direction, and determine that a size of the LPUs is equal to a size of the point cloud data along the direction.

Example 22C: The device of example 18C, wherein: the directions include an x, y, and z direction, and one of: the point cloud data is split in a vertical direction, and the sizes of the LPUs in x and y directions are equal to sizes of the point cloud data in the x and y directions, the point cloud data is split in a horizontal X direction, and the sizes of the LPUs in y and z directions are equal to sizes of the point cloud data in the x and y directions, or the point cloud data is split in a horizontal Y direction, and the sizes of the LPUs in x and z directions are equal to sizes of the point cloud data in the x and y directions.

Example 23C: The device of example 18C, further comprising a display to present imagery based on the point cloud data.

Example 24C: A device for encoding point cloud data includes a memory configured to store the point cloud data; and one or more processors implemented in circuitry, the one or more processors configured to: determine that the point cloud data is split into a plurality of largest prediction units (LPUs), wherein at least two of the LPUs have different sizes along different directions; perform inter prediction to determine predicted points for the LPUs; and encode points within the LPUs based on the predicted points for the LPUs.

Example 25C: The device of example 24C, wherein the one or more processors are configured to, as part of determining that the point cloud data is split into a plurality of LPUs: signal a first indication indicating whether the point cloud data is split into the LPUs in an x direction; signal a second signaled indication indicating whether the point cloud data is split into the LPUs in a y direction, or signal a third signaled indication indicating whether the point cloud data is split into the LPUs in a z direction.

Example 26C: The device of example 24C, wherein the one or more processors are configured to, for at least one direction of an x, y, or z direction, signal a syntax element indicating whether splitting of the point cloud data is enabled in the direction and a size of the LPUs along the direction.

Example 27C: The device of example 24C, wherein: the directions include an x, y, and z direction, and one of: the point cloud data is split in a vertical direction, and the sizes of the LPUs in x and y directions are equal to sizes of the point cloud data in the x and y directions, the point cloud data is split in a horizontal X direction, and the sizes of the LPUs in y and z directions are equal to sizes of the point cloud data in the x and y directions, or the point cloud data is split in a horizontal Y direction, and the sizes of the LPUs in x and z directions are equal to sizes of the point cloud data in the x and y directions.

Example 28C: The device of example 24C, further comprising a device to generate the point cloud data.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding point cloud data, the method comprising:

determining that the point cloud data is split into a plurality of largest prediction units (LPUs) in accordance with a quadtree-binary tree splitting, wherein at least two of the LPUs have different sizes along different directions and are non-cubic, and wherein the sizes of LPUs align with the quadtree-binary tree splitting of the point cloud data determined by octree geometry coding, wherein determining that the point cloud data is split into the LPUs comprises:

determining that splitting of the point cloud data is not enabled along at least one direction of an x, y, or z direction, and based on the determination that splitting of the point cloud data is not enabled along the direction, determining that a size of the LPUs is equal to a size of the point cloud data along the direction;

performing inter prediction to determine predicted points for the LPUs; and reconstructing points within the LPUs based on the predicted points for the LPUs.

2. The method of claim 1, wherein:

the LPUs include a first LPU and a second LPU, and performing inter prediction to determine the predicted points within the LPUs comprises:

determining predicted points within the first LPU based on a previously reconstructed point cloud without application of global motion compensation to the previously reconstructed point cloud; and determining predicted points within the second LPU based on the previously reconstructed point cloud with application of global motion compensation to the previously reconstructed point cloud.

3. The method of claim 1, wherein performing inter prediction to determine predicted points within the LPUs comprises:

determining a motion of an LPU of the plurality of LPUs; and using the motion of the LPU to predict points within the LPU.

4. The method of claim 1, further comprising:

determining that splitting the point cloud data is enabled at least along another one of the x, y or z direction; and based on splitting the point cloud being enabled at least along another one of the x, y, or z direction:

determining, based on a first signaled indication, that the point cloud data is split into the LPUs in the x direction;

determining, based on a second signaled indication, that the point cloud data is split into the LPUs in the y direction, or determining, based on a third signaled indication, that the point cloud data is split into the LPUs in the z direction.

5. The method of claim 1, wherein determining that splitting of the point cloud data is not enabled along at least one of the x, y, or z direction comprises, for at least one direction of the x, y, and z direction, obtaining a syntax element indicating whether splitting of the point cloud data is enabled for that one of the x, y, and z direction.

6. The method of claim 1, wherein:
one of:
the point cloud data is split in a vertical direction, and the sizes of the LPUs in x and y directions are equal to sizes of the point cloud data in the x and y directions,
the point cloud data is split in a horizontal x direction, and the sizes of the LPUs in y and z directions are equal to sizes of the point cloud data in the y and z directions, or
the point cloud data is split in a horizontal y direction, and the sizes of the LPUs in x and z directions are equal to sizes of the point cloud data in the x and z directions.

7. The method of claim 1, wherein determining that the point cloud data is split into the plurality of LPUs comprises determining, based on a syntax element signaled in a header level, that the point cloud data is split into the LPUs in only one of the directions, and wherein the only of the directions is different than the at least one direction along which splitting of the point cloud data is not enabled.

8. A method of encoding point cloud data, the method comprising:
determining that the point cloud data is split into a plurality of largest prediction units (LPUs) in accordance with a quadtree-binary tree splitting, wherein at least two of the LPUs have different sizes along different directions and are non-cubic, and wherein the sizes of LPUs align with the quadtree-binary tree splitting of the point cloud data determined by octree geometry coding, wherein determining that the point cloud data is split into the LPUs comprises:
determining that splitting of the point cloud data is not enabled along at least one direction of an x, y, or z direction, and
in a condition where splitting of the point cloud data is not enabled along the direction, determining that a size of the LPUs is equal to a size of the point cloud data along the direction;
performing inter prediction to determine predicted points for the LPUs; and
encoding points within the LPUs based on the predicted points for the LPUs.

9. The method of claim 8, wherein:
the LPUs include a first LPU and a second LPU, and
performing inter prediction to determine the predicted points within the LPUs comprises:
determining predicted points within the first LPU based on a previously reconstructed point cloud without application of global motion compensation to the previously reconstructed point cloud; and
determining predicted points within the second LPU based on the previously reconstructed point cloud with application of global motion compensation to the previously reconstructed point cloud.

10. The method of claim 8, wherein performing inter prediction to determine predicted points within the LPUs comprises:
determining a motion of an LPU of the plurality of LPUs; and
using the motion of the LPU to predict points within the LPU.

11. The method of claim 8, further comprising:
determining that splitting the point cloud data is enabled at least along another one of the x, y or z direction; and
in a condition where splitting the point cloud data is enabled at least along another one of the x, y or z direction:
signaling a first indication indicating whether the point cloud data is split into the LPUs in the x direction;
signaling a second signaled indication indicating whether the point cloud data is split into the LPUs in the y direction, or
signaling a third signaled indication indicating whether the point cloud data is split into the LPUs in the z direction.

12. The method of claim 8, further comprising, for at least one direction of the x, y, and z direction, signaling a syntax element indicating whether splitting of the point cloud data is enabled for that one of the x, y, and z direction.

13. The method of claim 8, wherein:
one of:
the point cloud data is split in a vertical direction, and the sizes of the LPUs in x and y directions are equal to sizes of the point cloud data in the x and y directions,
the point cloud data is split in a horizontal X direction, and the sizes of the LPUs in y and z directions are equal to sizes of the point cloud data in the y and z directions, or
the point cloud data is split in a horizontal Y direction, and the sizes of the LPUs in x and z directions are equal to sizes of the point cloud data in the x and z directions.

14. The method of claim 8, further comprising signaling a syntax element in a header level indicating that the point cloud data is split into the LPUs in only one of the directions, and wherein the only of the directions is different than the at least one direction along which splitting of the point cloud data is not enabled.

15. A device for decoding point cloud data, the device comprising:
a memory configured to store the point cloud data; and
one or more processors implemented in circuitry, the one or more processors configured to:
determine that the point cloud data is split into a plurality of largest prediction units (LPUs) in accordance with a quadtree-binary tree splitting, wherein at least two of the LPUs have different sizes along different directions and are non-cubic, and wherein the sizes of LPUs align with the quadtree-binary tree splitting of the point cloud data determined by octree geometry coding, wherein to determine that the point cloud data is split into the LPUs, the one or more processors are configured to:
determine that splitting of the point cloud data is not enabled along at least one direction of an x, y, or z direction, and
based on the determination that splitting of the point cloud data is not enabled along the direction, determine that a size of the LPUs is equal to a size of the point cloud data along the direction;
perform inter prediction to determine predicted points for the LPUs; and
reconstruct points within the LPUs based on the predicted points for the LPUs.

16. The device of claim 15, wherein the one or more processors are configured to:

determine that splitting the point cloud data is enabled at least along another one of the x, y or z direction; and based on splitting the point cloud being enabled at least along another one of the x, y, or z direction:

determine, based on a first signaled indication, that the point cloud data is split into the LPUs in the x direction;

determine, based on a second signaled indication, that the point cloud data is split into the LPUs in the y direction, or determine, based on a third signaled indication, that the point cloud data is split into the LPUs in the z direction.

17. The device of claim 15, wherein to determine that splitting of the point cloud is not enabled along at least one of the x, y, or z direction, the one or more processors are configured to for at least one direction of the x, y, and z direction, obtain a syntax element indicating whether splitting of the point cloud data is enabled for that one of the x, y, and z direction.

18. The device of claim 15, wherein:

one of:

the point cloud data is split in a vertical direction, and the sizes of the LPUs in x and y directions are equal to sizes of the point cloud data in the x and y directions, the point cloud data is split in a horizontal X direction, and the sizes of the LPUs in y and z directions are equal to sizes of the point cloud data in the y and z directions, or the point cloud data is split in a horizontal Y direction, and the sizes of the LPUs in x and z directions are equal to sizes of the point cloud data in the x and z directions.

19. The device of claim 15, further comprising a display to present imagery based on the point cloud data.

20. A device for encoding point cloud data, the device comprising:

a memory configured to store the point cloud data; and one or more processors implemented in circuitry, the one or more processors configured to:

determine that the point cloud data is split into a plurality of largest prediction units (LPUs) in accordance with a quadtree-binary tree splitting, wherein at least two of the LPUs have different sizes along different directions and are non-cubic, and wherein the sizes of LPUs align with the quadtree-binary tree splitting of the point cloud data determined by octree geometry coding, wherein to determine that the point cloud data is split into the LPUs, the one or more processors are configured to:

determine that splitting of the point cloud data is not enabled along at least one direction of an x, y, or z direction, and in a condition where splitting of the point cloud data is not enabled along the direction, determine that a size of the LPUs is equal to a size of the point cloud data along the direction;

perform inter prediction to determine predicted points for the LPUs; and encode points within the LPUs based on the predicted points for the LPUs.

21. The device of claim 20, wherein the one or more processors are configured to:

determine that splitting the point cloud data is enabled at least along another one of the x, y or z direction; and in a condition where splitting the point cloud data is enabled at least along another one of the x, y or z direction:

signal a first indication indicating whether the point cloud data is split into the LPUs in the x direction;

signal a second signaled indication indicating whether the point cloud data is split into the LPUs in the y direction, or signal a third signaled indication indicating whether the point cloud data is split into the LPUs in the z direction.

22. The device of claim 20, wherein the one or more processors are configured to, for at least one direction of the x, y, or z direction, signal a syntax element indicating whether splitting of the point cloud data is enabled for that one of the x, y, or z direction.

23. The device of claim 20, wherein:

one of:

the point cloud data is split in a vertical direction, and the sizes of the LPUs in x and y directions are equal to sizes of the point cloud data in the x and y directions, the point cloud data is split in a horizontal X direction, and the sizes of the LPUs in y and z directions are equal to sizes of the point cloud data in the y and z directions, or the point cloud data is split in a horizontal Y direction, and the sizes of the LPUs in x and z directions are equal to sizes of the point cloud data in the x and z directions.

24. The device of claim 20, further comprising a device to generate the point cloud data.

* * * * *